United States Patent [19]

Watari et al.

[11] Patent Number: 5,704,013
[45] Date of Patent: Dec. 30, 1997

[54] MAP DETERMINATION METHOD AND APPARATUS

[75] Inventors: Masao Watari, Ibaragi; Kazuo Ishii, Kanagawa; Yasuhiko Kato, Kanagawa; Hiroaki Ogawa, Kanagawa; Masanori Omote, Kanagawa; Kazuo Watanabe; Katsuki Minamino, both of Tokyo, all of Japan

[73] Assignee: Sony Corporation, Tokyo, Japan

[21] Appl. No.: 365,493

[22] Filed: Dec. 28, 1994

[51] Int. Cl.$^6$ .................................................. G06F 15/18
[52] U.S. Cl. ................................................................ 395/23
[58] Field of Search ........................... 395/22, 24, 21, 395/23, 2.41, 14, 27; 364/413.13; 381/41

[56] References Cited

U.S. PATENT DOCUMENTS

| | | | |
|---|---|---|---|
| 4,797,941 | 1/1989 | Lloyd et al. | 382/27 |
| 4,980,917 | 12/1990 | Hutchins | 381/41 |
| 5,058,179 | 10/1991 | Denker et al. | 382/14 |
| 5,113,483 | 5/1992 | Keeler et al. | 395/23 |
| 5,187,658 | 2/1993 | Cline et al. | 364/413.13 |
| 5,271,090 | 12/1993 | Boser | 395/21 |
| 5,276,771 | 1/1994 | Manukian et al. | 395/24 |
| 5,317,675 | 5/1994 | Ikehara | 395/23 |
| 5,461,696 | 10/1995 | Frank et al. | 395/2.41 |

OTHER PUBLICATIONS

Lu et al., A new method for inverting Nonlinear Multilayer Feedforward Networks, IECON 91, pp. 1349-1354 Nov. 1, 1991.

Yan et al., Weight adjustment rule of neural networks for computing discrete 2-D Gabor transforms (image processing), IEEE transactions on acoustics, speech and signal, pp. 1654-1656 Sep. 1990.

Moody et al., Neural network construction and rapid learning for system identification, IEEE International Symposium on Intelligent Control, pp. 475-480 Aug. 27, 1993.

*Primary Examiner*—Robert W. Downs
*Assistant Examiner*—Sanjiv Shah
*Attorney, Agent, or Firm*—Limbach & Limbach LLP

[57] ABSTRACT

A map determination method and apparatus for calculating the coefficients to give a minimum evaluation function quickly and reliably where a map is expressed as the linear sum of a function $g_i(X)$ and a coefficient $c_i$ while a map for transforming a N-dimensional vector $(x_0, x_1, x_2, x_3)$ to a M-dimensional vector y is being decided. The coefficient ci for the map is obtained by giving a learning sample and a teaching sample, obtaining an evaluation function and solving a simultaneous linear equation for which the partial differential is zero.

33 Claims, 13 Drawing Sheets

MAP DETERMINATION METHOD AND APPARATUS

BACKGROUND OF THE INVENTION

1. Field of the Invention

The present invention relates to a map determination method and apparatus to meet with the demands of a wide range of fields such as control systems for pattern recognition, pattern generation, and production robots etc. and prediction process systems for economic problems etc., and in particular relates to a map determination method and apparatus capable of expressing arbitrary-consequtive maps at the necessary precision, capable of preventing an evaluation function failing to an extremely small value and capable of expressing the desired map in an effective and efficient manner when decisions are made by learning map characteristics.

2. Description of the Related Art

Process systems which generate output vectors of a prescribed number of dimensions with respect to input vectors of a prescribed number of dimensions and construct a map to be outputted are used in a wide range of fields such as pattern recognition including speech and image recognition, pattern generation such as speech synthesis and computer graphics etc., prediction process systems for predicting business conditions and predicting share prices etc. and control systems for production robots etc.

For example, linear or non-linear maps are used in speech and image recognition with the aim of taking characteristic vectors obtained from input data using digital signal processing and putting them in compressed form etc.

For example, orthogonal transforms such as DFTs (Discrete Fourier Transforms) etc. are taken as linear maps to be used as maps in mathematical transforms and logarithmic transforms etc. are taken as non-linear maps. However, these are maps which are already decided, which makes it difficult to adopt them into systems where an arbitrary output vector is obtained for an arbitrary input vector.

Here, research was made into methods of determination where maps for a prescribed purpose are learned. Typical examples of maps being decided by this kind of learning would be KL transforms for linear items and hierarchal neural networks for non-linear items. In particular, applications can be made to a wider range of fields than that in the conventional art by theoretically expressing arbitrary consecutive maps by increasing the number of intermediate layers in a hierarchal neural network.

These hierarchal neural networks are connected in the direction from the input to the output so that the output of each basic unit (neuron element) becomes the input of each basic unit in the following layer in the way shown, for example, in FIG. 15. This is a three-layer neural network with the input layer having four elements (1 to 4), the intermediate layer having three elements (5 to 7) and the output layer having one element (8).

The specific process contents for a typical three layer neural network with an N element input layer, an L element intermediate layer and an M element output layer where the input for the input layer is taken as the input vector $X=(x_0, x_1, x_2, \ldots, x_{N-1})$ and the corresponding output from the output layer is taken as the output vector $Y=(y_0, y_1, y_2, \ldots, y_{M-1})$ will now be described.

The output from the N elements in the input layer is then simply each of the respective inputs $x_i$ ($i=0, 1, 2, \ldots, N-1$).

These outputs are then inputted without modification into the following L elements for the intermediate layer. The following equation is calculated and outputted at the intermediate layer. Here, $\omega_{ij}$ is the connection weighting coefficient and $s(x)$ is the Sigmoid function.

$$X'_j = S\left( \sum_{i=0}^{n} X_i \omega_{ij} \right) \quad (1)$$

where $j=0, 1, 2, \ldots, L-1$ and $XN\omega Nj=\omega NJ$

The outputs $x'_j$ ($j=0, 1, 2, \ldots, L-1$) from the L elements in the intermediate layer are taken as input by the M elements in the output layer, with the output layer then computing the following equation.

$$Y_k = S\left( \sum_{j=0}^{L} X_j \omega'_{kj} \right) \quad (2)$$

where $k=0, 1, 2, \ldots, M-1$ and $X'L\omega'kL=\omega'kL$

The structure is then basically the same for networks of four heirarchal layers or more with the exception of the number of stages in the relationship between the input and output increasing.

Neural networks are limited by this kind of structure in order to attach characteristics to the map (i.e. in order to set up a weighting coefficient $\omega$), learning samples are given to the input layers and outputs (:neural network outputs) from the maps for each of the learning samples are obtained. Teaching vectors are then given which correspond to these map outputs and the sum of the square error for the map outputs and the teaching vectors is then set up as the evaluation function. The connection weighting coefficient is then decided using back propogation.

This back propogation is the realization of the maximum descent method (probability descent method) for every item of data with respect to the neural network.

However, with the steepest descent method, this result depends on the shape of the evaluation function which in turn depends on the way of considering the initial value for the evaluation function. The optimal solution (arithmetic value) corresponding to the minimum value (global minimum) cannot therefore be found and an extremely small value (local minimum) is therefore found.

In the case of an evaluation constant for a neural network, which is exactly the case here, there is no guarantee that the solution found using back propagation corresponds to the minimum error. In other words there is the possibility that an output may be given which differs greatly from the teaching vector depending on the way in which the initial value is considered.

As a result of this, steps were devised where a semi-optimal solution was obtained within the permissable limits by, for example, producing swings using random numbers for the initial value and then carrying out repeated learning etc.

There is, however, basically no guarantee that these remedies will provide the optimal solution and there also remains the possibility that the semi-optimal solution will provide a large error when compared with the minimum error for the optimal solution. A great deal of learning time is also required to find this semi-optimal solution.

In the ideal case, when expressing a neural network as arbitrary consequtive maps, the number of neuron elements in the intermediate layer can be set to be infinite. However, in reality, the desired map is constructed using a finite number of intermediate layer neuron elements. To put this another way, the performance of a neural network is determined by how far the ideal map can be approximated in the case where the number of actual elements in the intermediate layer has been limited.

However, in addition to the connection weighting coefficient with regards to the degree of freedom in the structure of the neural network, the number of heirarchal stages and the number of elements also influence the scale of the neural network. The approximation performance of a neural network is therefore not sufficient within the restraints of a realistic scale.

Neural networks in the learning type mapping apparatus for the prior art therefore have the following three problems at the time of learning.

(1) The minimum error is not guaranteed and there is the chance of it becoming an extremely small value.

(2) If obtaining of a solution near the optimal solution is a requirement, a large amount of learning time is necessary.

(3) The approximation performance for the desired map is not sufficient on a realistic scale.

As the present invention sets out to resolve these kinds of problems, its aim is to obtain the optimal solution reliably in a short period of time and obtain maps at a higher approximation performance.

Also, as well as operating on a lower capacity in the case where data is stored for processing and making additional learning a possibility, higher discrimination performance is also provided.

SUMMARY OF THE INVENTION

Therefore, according to the present invention, a map deciding method for obtaining a map F from N-dimensional weighted vector space $\Omega_N$ to M-dimensional weighted vector space $\Omega_M$ comprises the following steps. A first step of setting up L complete component functions $g_{lm}(X)$ based on the distribution of samples grouped into Q categories in the N-dimensional weighted vector space $\Omega_N$. A second step of expressing the function $f_m(X)$ for the mth component of the map F as the linear sum of the function $g_{lm}(X)$ and the $L_m$ coefficients $c_{lm}$. A third step of considering Q teaching vectors $(t_{a0}, t_{a1}, t_{a2}, \ldots t_{a(m-1)})$ with respect to the categories over M-dimensional weighted vector space $\Omega_M$, computing a prescribed evaluation function J and obtaining the coefficient $c_{lm}$ which makes this evaluation function J a minimum and a fourth step of storing the coefficient $c_{lm}$ obtained in the third step in memory.

In this invention, the evaluation function J is expressed by:

$$J = \sum_{q=0}^{Q-1} E\{X \in S_q\} \cdot \left\{ \sum_{m=0}^{M-1} (f_m(X) - t_{qm})^2 \right\}$$

when $E\{X \in S_q\} \cdot \{f(x)\}$ is computed across all elements of the learning samples $S_q$ to obtain the desired value for the function $f(X)$.

Also, in the third step, the partial differential is found for the evaluation function J using the coefficient $c_{lm}$, and the coefficient $c_{lm}$ is then found by making the partial differential zero in order to make the evaluation function J a minimum.

Further, the function $g_{lm}(X)$ may be a variable monomial.

Additionally, the third step may be comprised of the following steps.

A step of computing $$\alpha_{mij} = \sum_{q=0}^{Q-1} E\{X \in S_q\} \cdot \{g_{im}(X) \cdot g_{jm}(X)\}$$

A step of computing $$\beta_{mi} = \sum_{q=0}^{Q-1} t_{qm} \cdot E\{X \in S_q\} \cdot \{g_{im}(X)\}$$

and a step of computing $$\sum_{j=n}^{L_m-1} \alpha_{mij} \cdot c_{jm} - \beta_{mi} = 0$$

to the coefficient $c_{jm}$.

In this invention, the coefficient clm suitable for use in the steepest descent method for the evaluation function J is obtained.

This method may also further comprise calculating the Sigmoid function with respect to the map output for the function $f_m(X)$ obtained as a result of having obtained the coefficient $c_{lm}$.

Also, in the present invention, a map determination method for obtaining a map F from N-dimensional weighted vector space $\Omega_N$ to M-dimensional weighted vector space $\Omega_M$ may also comprise the following four steps. A first step of setting up L complete component functions $g_{lm}(X)$ based on the distribution of samples grouped into Q categories in the N-dimensional weighted vector space $\Omega_N$. A second step of expressing the function $f_m(i, X)$ for the mth component of the map F updated at the ith time as the linear sum of the function $g_{lm}(X)$ and the $L_m$ coefficients $c_{lm}(i)$. A third step of considering Q teaching vectors $(t_{a0}, t_{a1}, t_{a2}, \ldots t_{a(m-1)})$ with respect to the categories over M-dimensional weighted vector space $\Omega_M$, computing a prescribed evaluation function J and obtaining the coefficient $c_{lm}(i)$ which makes this evaluation function J a minimum and a fourth step of storing the coefficient $c_{lm}(i)$ obtained in the third step in memory.

Here, the third step may comprise a step of computing the error between the map fm(i. X) for every learning data category and the teaching vector $t_{qm}$ using $$D_{qm}(i, x) = f_m(i, x) - t_{qm};$$

and step of successively updating the coefficient clm(i) using $$c_{lm}(i+1) = c_{lm}(i) - \epsilon \cdot D_{qm}(i, x) \cdot g_{lm}(x)$$

taking the (i+1)th item of learning data as X, the (i+1)th item for the coefficient $c_{lm}(i)$ as $c_{lm}(i+1)$ and $\epsilon$ as a prescribed updating constant.

Further, the first step may also comprise the following steps. A step of obtaining each component coordinate correlation coefficient with respect to the learning data belonging to each of the categories q using a prescribed operational equation. A step of deciding a monomial taken as a normalized function from a combination of the coordinate components for which the correlation coefficient becomes large. A step of making a combination from the monomial taken as the normalized function for choosing a high order normalized function. A step of repeating the process of choosing the high order normalized function a prescribed number of times and a step of arranging the combinations obtained in the repeated processes in order of largeness of correlation coefficient and in order of the smallness of the monomial and then selecting a prescribed number of items.

Also, the operational equation for obtaining the correlation coefficient may be expressed by the equation $$\rho_{q,k,l} = \frac{\sum_{X_q \in S_q} (X_{qk} - \mu_k) \cdot (X_{ql} - \mu_l)}{\left( \sum_{X_q \in S_q} X_{qk} - \mu_k \right)^{1/2} \cdot \left( \sum_{X_q \in S_q} X_{ql} - \mu_l \right)^{1/2}}$$

$$\mu_k = \frac{\sum_{X_q \in S_q} X_{qk}}{|S_q|} \quad (0 \leq k \leq N-1)$$

where k is the average component value.

The aforementioned method is also suited to the realization of a map-determination apparatus.

In this device, memory recall means for recalling the coefficient $c_{lm}$ for minimizing the evaluation function J (for example, the coefficient storage section 32 in FIG. 3) and mathematical operation means, for calculating a coefficient $f_m$ (X) based on equation 6 (for example, the GGM calculating section in FIG. 3), are provided.

In the map determination method and apparatus constructed in the way shown above, the function $f_m(X)$ of the $m^{th}$ component of the map F can be represented by the linear sum of the coefficient $c_{lm}$ and the function $g_{lm}(X)$ of $L_m$. Also, the optimal solution (minimum value) can be obtained without dropping to extremely small values.

DETAILED DESCRIPTION OF THE PREFERRED EMBODIMENTS

First Embodiment

In the present invention, the map F from N-dimensional weighted vector space $\Omega_N$ to M-dimensional weighted vector space $\Omega_M$ is determined, and the function $f_m(X)$ of the $m^{th}$ component of map F is defined as the linear sum of the function $g_{lm}(X)$ of $L_m$ as shown in the following.

$$f_m(X) = \sum_{l=0}^{L_m-1} C_{lm} g_{lm}(X) \quad (3)$$

Here, $X=(x_0, x_1, x_2, \ldots x_{N-1})$, and $c_{lm}$ is a prescribed coefficient.

Specifically, in the present invention, the complete function group over. N variable function space is employed as function $g_{lm}(X)$. Using functional analysis, from the theorem stating that "Arbitrary functions can be expressed as the linear combination of a complete functional group", it will be understood that by making the coefficient $L_m$ sufficiently large, in principal, arbitrary consecutive maps can be expressed by this function $g_{lm}(X)$.

This is equivalent to saying that if the number of neuron elements of the intermediate layer in the hierarchical neural network is made sufficiently large, in principal, arbitrary consecutive maps can be expressed.

Figure 1:
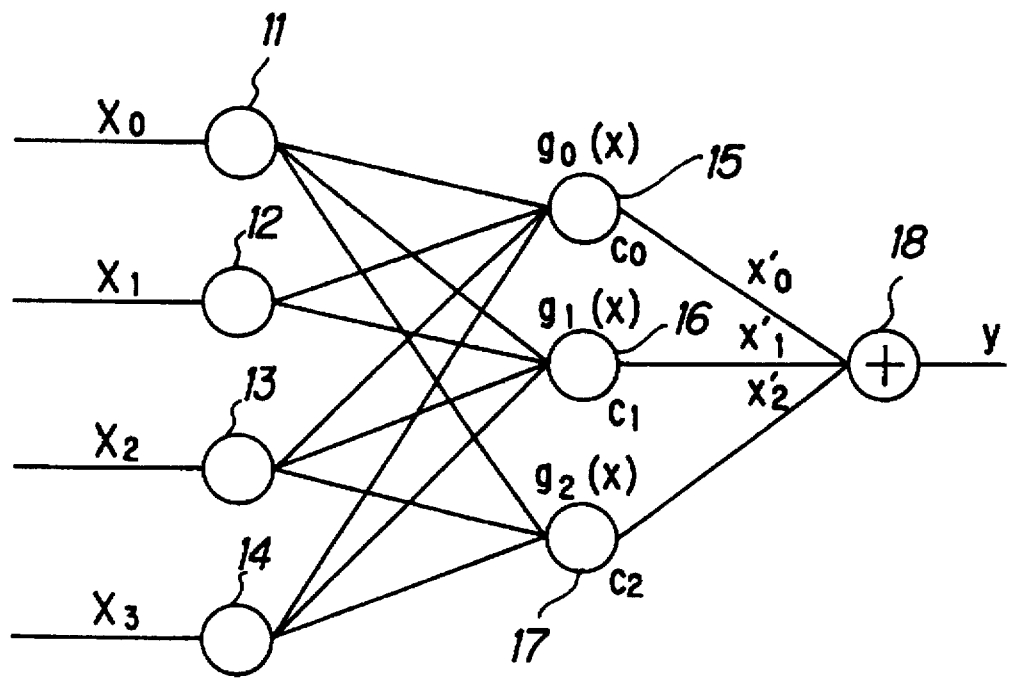
FIG. 1 is a view of a neural network of the present invention compared to the prior art.
Figure 15:
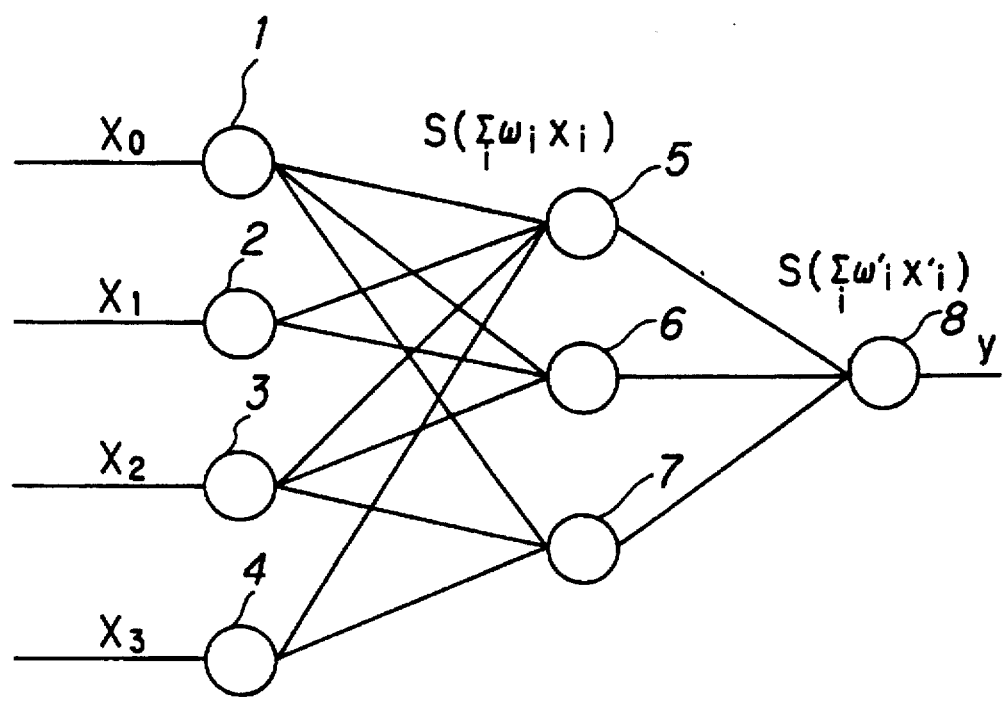
FIG. 15 is a view of a neural network for the prior art.

In order to make a comparison with the prior art neural network shown in FIG. 15, if the map of the present invention is represented as a map, it would be as shown in FIG. 1.

Specifically, inputs $x_0$ to $x_3$ are inputted to element 11 through element 14. These inputs are outputted directly from intermediate layer elements 15 to 17.

The intermediate layer element 15 can be calculated by expressing it in the form of the following equation.

$$x'_0 = c_0 g_0(X) \quad (4)$$

Specifically, after calculating a function value of function $g_0(X)$ (=$g_0(x_0, x_1, x_2, x_3)$) from variables $x_0, x_1, x_2, x_3$, coefficient $c_0$ is multiplied. Similarly, elements 16 and 17 can be calculated by expressing them using the following equations.

$$x'_1 = c_1 g_1(x) \quad (5)$$

$$x'_2 = c_2 g_2(x) \quad (6)$$

Also, with respect to output layer element 18, outputs $x'_0$, $x'_1$, $x'_2$, of intermediate layer elements 15 to 17 are added and output y is obtained.

As a result, if the function $g_i$ (X) is selected and established in the prescribed form, then, by establishing the coefficient $c_i$ in the prescribed form by learning, the map F can be obtained. The function $g_i(x)$ should be selected such that a pattern structure to be processed (a pattern of input data) can be discriminated more clearly. For example, when the pattern has a distribution of three classes (categories) in one dimension, the pattern cannot be discriminated clearly be selecting only 1 and x as the $g_i(x)$. In this case, $x^i$ (where i>1) should be added to the $g_i(x)$ in order to discriminate the pattern.

In order to determine this coefficient $c_i$, the evaluation function J expressed in the following equation is computed using learning samples (a set of learning samples for category $c_q$ are defined as $S_q$ (=$(S_{q0}, S_{q1}, \ldots, S_{q(N-1)})$)) existing in N-dimensional weighted vector space $\Omega_N$ classified into Q categories $C_q$ (q=0, 1, 2, . . . , Q-1), and providing Q teaching vectors $T_q$ (=$(t_{q0}, t_{q1}, t_{q2}, \ldots, t_{q(M-1)})$) existing in M dimension (weighted) vector space $\Omega M$ corresponding to respective categories $C_q$.

$$J = \sum_{q=0}^{Q-1} E\{X \in S_q\} \left\{ \sum_{m=0}^{M-1} \{f_m(X) - t_{qm}\}^2 \right\} \quad (7)$$

The expression within the section { } in the above expression $E\{X \in S_q\}$ { }, covers all constituents of the set $S_q$ of samples for learning, and signifies the calculation of an average value (anticipated value). Therefore, evaluation function J signifies the ensemble average of the square error of the teaching vector and the map output corresponding to the learning sample.

If equation (3) is substituted into equation (7), the following expression is obtained.

$$J = \sum_{q=0}^{Q-1} \sum_{m=0}^{M-1} \left\{ \sum_{i=0}^{L_m-1} \sum_{j=0}^{L_m-1} c_{im}c_{jm}E\{X \in S_q\}\{g_{im}(X)g_{jm}(X)\} - \right. \quad (8)$$

$$\left. 2 \sum_{i=0}^{L_m-1} c_{im}t_{qm}E\{X \in S_q\}\{g_{im}(X)\} + (t_{qm})^2 \right\}$$

Here, if equations 9 and 10 below are assumed, equation 8 can be expressed as the following equation 11.

$$\alpha_{qmij} = E\{X \in S_q\}\{g_{im}(X)g_{jm}(X)\} \quad (9)$$

$$\beta_{qmi} = E\{X \in S_q\}\{g_{im}(X)\} \quad (10)$$

$$J = \sum_{q=0}^{Q-1} \sum_{m=0}^{M-1} \left\{ \sum_{i=0}^{L_m-1} \sum_{j=0}^{L_m-1} c_{im}c_{jm}\alpha_{qmij} - 2 \sum_{i=0}^{L_m-1} c_{im}t_{qm}\beta_{qmi} + (t_{qm})^2 \right\} \quad (11)$$

In order to search for the extreme values of evaluation function J, partial differentiation is carried out for $c_{im}$ by expressing equation 11 as the following equation, with this value being assumed to be 0.

$$\frac{\partial J}{\partial c_{im}} = 0 \quad (12)$$

By performing the calculation as shown in equation 12, equation 11 can be further reduced to the following equation.

$$\sum_{q=0}^{Q-1} \left\{ \sum_{j=0}^{L_m-1} \alpha_{qmij}c_{jm} - t_{qm}\beta_{qmi} \right\} = 0 \quad (13)$$

Equation 13 comprises simultaneous linear equations relating to an unknown number (coefficient) $c_{jm}$ (j=0,1, ..., $L_{m-1}$) of $L_m$, for each m.

Equation 13 can be further simplified by substituting in the following equations 14 and 15, to yield the concise form shown in equation 16.

$$\alpha_{mij} = \sum_{q=0}^{Q-1} \alpha_{qmij} \quad (14)$$

$$\beta_{mi} = \sum_{q=0}^{Q-1} t_{qm}\beta_{qmi} \quad (15)$$

$$\sum_{j=0}^{L_m-1} \alpha_{mij}c_{jm} - \beta_{mi} = 0 \quad (16)$$

Because equations 13 and 16 are linear-equations, special indefinite or impossible situations are excluded and a solution can be obtained unambiguously.

This means that $c_{jm}$, which is equivalent to the minimum value of evaluation function J expressed in equation 8, can be determined by solving equations 13 and 16.

This "unambiguous solution deciding" characteristic means that a process for learning by repeatedly modifying an initial value is not necessary in order to search for a solution almost as optimum as would be found with a neural net. Also, in order to express the map shown in equation 3, the degree of freedom of the value of coefficient $c_{jm}$ becomes the degree of freedom possessed by whichever function is employed as function $g_{im}(X)$ (there are generally two types of degree of freedom).

As a result, if consideration is given to a similar extent, the potential expression capacity of the map is larger for the above mentioned map determining method (CGM (Guaranteed Global minimum Mapping)) of the present invention than for a neural network. This is because, in the case of a neural network, if the scope is fixed, the degree of freedom of the remaining expression becomes the degree of freedom obtained from the combined weighting coefficient value.

Second Embodiment

Next, the present invention will be described with reference to an embodiment applied to a discriminator device for carrying out discrimination for two categories of two dimensional data.

In this embodiment the number of dimensions N of the input space=2, the number of dimensions M of the output space=1, and the number of categories Q=2 (these categories are $C_0$, $C_1$). In each category, 23 samples are provided as learning data (artificial data), and the teaching vectors of categories $C_0$, $C_1$ are $T_0$=(0) and $T_1$=(1), respectively (in this case, from when M=1, scalar).

In this embodiment, from the case of M=1, subscripts for succeeding m's will be omitted. For example, $L_m$ will therefore be abbreviated to L.

Table 1 is a list of the two dimensional data for the respective twenty three samples (learning samples) of categories $C_0$, $C_1$ for this embodiment.

TABLE 1

| Sample No. | $C_0$ | Sample No. | $C_1$ |
|---|---|---|---|
| 1 | (−0.24, 1.15) | 24 | (1.47, 1.76) |
| 2 | (0.45, 0.83) | 25 | (1.07, 1.31) |
| 3 | (−0.01, 1.12) | 26 | (1.42, 2.01) |
| 4 | (0.05, 1.39) | 27 | (1.06, 2.06) |
| 5 | (0.53, 0.90) | 28 | (1.26, 1.94) |
| 6 | (−0.04, 0.57) | 29 | (0.85, 1.80) |
| 7 | (−0.50, 1.22) | 30 | (1.75, 1.54) |
| 8 | (0.08, 1.31) | 31 | (1.80, 2.03) |
| 9 | (−0.26, 1.14) | 32 | (1.15, 1.57) |
| 10 | (0.21, 1.07) | 33 | (0.71, 1.47) |
| 11 | (3.58, 1.46) | 34 | (5.18, 0.87) |
| 12 | (3.43, 1.39) | 35 | (5.28, 1.18) |
| 13 | (2.59, 1.42) | 36 | (4.85, 1.41) |
| 14 | (2.82, 1.35) | 37 | (4.07, 1.23) |
| 15 | (2.87, 1.86) | 38 | (5.58, 1.48) |
| 16 | (3.34, 1.38) | 39 | (5.33, 0.65) |
| 17 | (3.33, 1.99) | 40 | (4.40, 1.25) |
| 18 | (3.12, 1.79) | 41 | (5.53, 1.25) |
| 19 | (3.91, 1.63) | 42 | (4.56, 1.39) |
| 20 | (3.81, 1.51) | 43 | (4.81, 1.26) |
| 21 | (1.00, 1.40) | 44 | (1.00, 1.40) |
| 22 | (4.00, 1.50) | 45 | (4.00, 1.50) |
| 23 | (2.00, 1.60) | 46 | (2.00, 1.60) |

Data sample Nos. 21 to 23 of category $C_0$ have been provided so as to be easily confused with data sample Nos. 44 to 46 of category $C_1$ (they have been made the same data).

Figure 2:
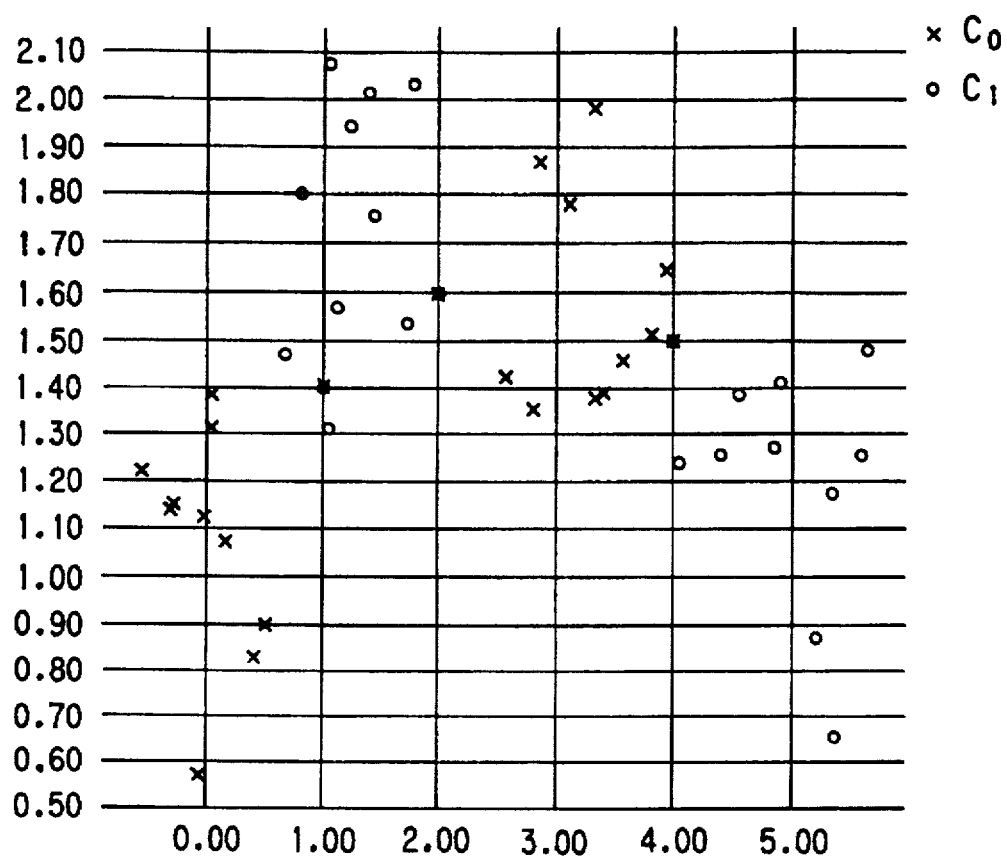
FIG. 2 is a view showing the two-dimensional arrangement of the data values in the second embodiment.

FIG. 2 shows the way in which these data items have been arranged two-dimensionally. In this diagram, the data values in table 1 are shown, with the pair of right-hand and left-hand values for each sample being represented on the ordinate axis and the abscissa axis, respectively.

Figure 3:
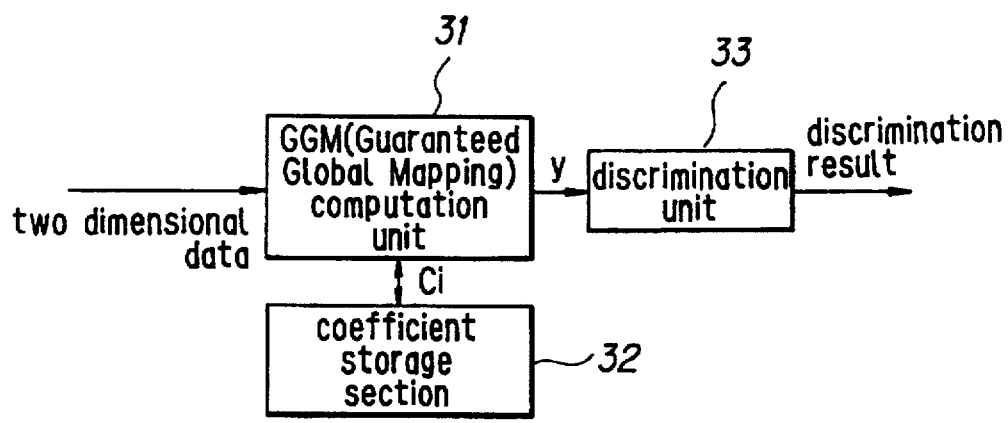
FIG. 3 is a view of an example of the structure of a discrimination circuit for processing two dimensional data in the second embodiment.

FIG. 3 shows an example of the construction of a discrimination circuit for processing the two dimensional data. The two dimensional data is inputted to the GGM (Guaranteed Global Mapping) computation unit 31, where it is subjected to an appointed operation. Appointed function $c_i$ is stored in the coefficient storage section 32, the GGM (Guaranteed Global Mapping) computation unit 31 appropriately compares the function $c_i$ stored in the coefficient storage section 32, and the appointed operation is performed. The output y of the GGM (Guaranteed Global Mapping) computation unit 31 is supplied to a discrimination unit 33, where the appointed discrimination is carried out.

Systems constructed of all monomials are the perfect systems, so by appropriately selecting monomial $g_i$, arbitrary consecutive maps can be expressed for maps generated from the linear combination of this monomial. Therefore, in this GGM (Guaranteed Global Mapping) computation unit 31, all members up to the fifth order of the two variable monomials are employed as the function $g_i$ (X). in the GGM (Guaranteed Global Mapping) computation unit 31, the map F function $f_m$ (X) is defined as in the following equation.

$$f_m(X) = c_{20}x_0^3 x_1^2 + c_{19}x_0^2 x_1^3 + c_{18}x_0^2 x_1^2 + c_{17}x_0 x_1^4 + c_{16}x_0 x_1^3 + c_{15}x_0 x_1^2 + c_{14}x_0^4 x_1 + c_{13}x_0^3 x_1 + c_{12}x_0^2 x_1 + c_{11}x_0 x_1 + c_{10}x_1^5 + c_9 x_1^4 + c_8 x_1^3 + c_7 x_1^2 + c_6 x_1 + c_5 x_0^5 + c_4 x_0^4 + c_3 x_0^3 + c_2 x_0^2 + c_1 x_0 + c_0 \quad (17)$$

This embodiment corresponds to the equation (3) when L=21.

Figure 4:
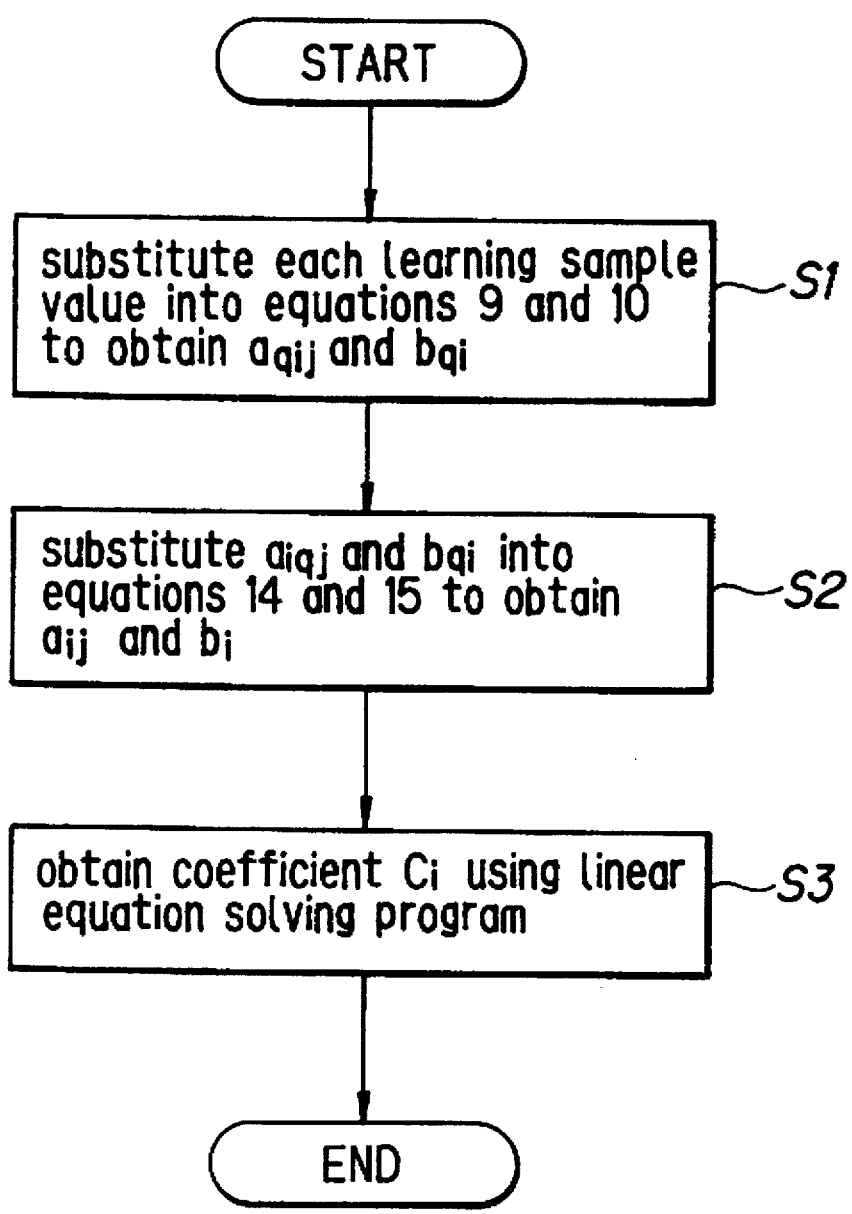
FIG. 4 is a flowchart showing how the computation unit computes the function $c_i$.

The GGM (Guaranteed Global Mapping) computation unit 31 computes the function $c_i$ in accordance with the processing shown in FIG. 4.

In step S1 of FIG. 4, the respective sample values of $L_m$ for each of categories $C_0$, $C_1$ are substituted into equations (9) and (10), and $a_{qij}$ and $b_{qi}$ (anticipated values) are obtained.

For example, when the function within the { } portion of the expression $E\{X \epsilon S_q\}$ { } in equation (10) has a constant of 1, the anticipated value (average value) is also 1. Therefore, $b_0=1$. By carrying out similar processing, each category sample data value is substituted into each function, and by computing average values, $b_{qi}$ can be obtained.

Also, for $a_{qij}$ of equation (9), because the value within the { } portion of the expression $E\{X \epsilon S_q\}$ { } is the sum of $g_i$ (X) and $g_j$ (X), that sum can be found by substituting in each category sample data and carrying out the average computation.

In the next step S2, $a_{qij}$ and $b_{qi}$ obtained in step S1 are substituted into equation 15 to find $a_{ij}$ and $b_i$.

Then, in the following step S3, 21 unknown values for $c_i$ are found from equation (16), using a linear equation solving program.

The coefficient $c_i$ found as described above is stored in the coefficient storage section 32.

Figure 5:
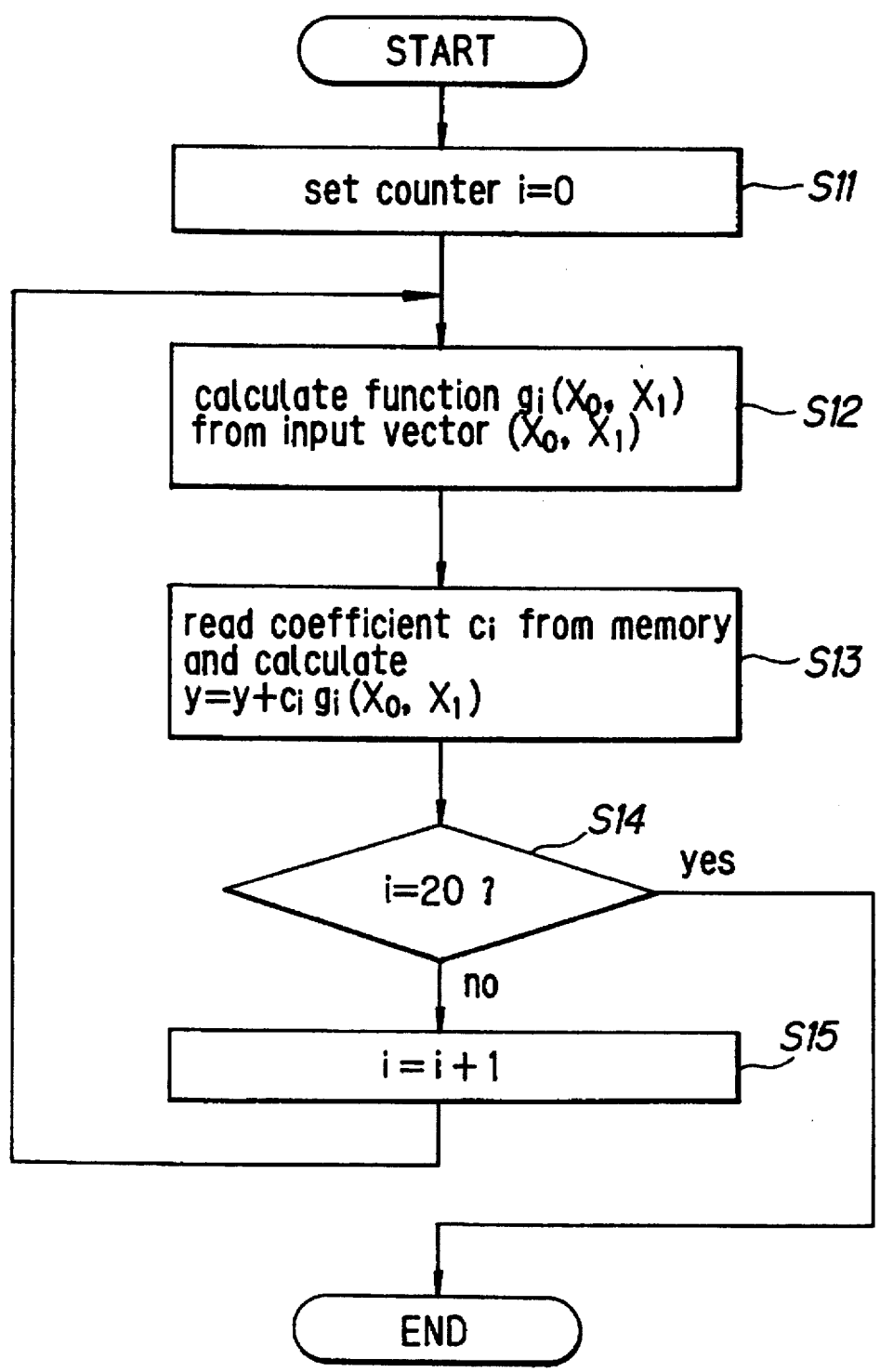
FIG. 5 is a flowchart showing how the computation unit carries out processing.

Once the coefficient $c_i$ has been obtained as described above, the GGM (Guaranteed Global Mapping) computation unit 31 executes processing as shown in FIG. 5 for the two dimensional data (learning samples) that have been inputted.

Initially, in step S11, the counter i and the output Values y are initialized to 0. Advancing to the next step S12, function $g_i$ ($x_0$, $x_1$) is computed from input vectors ($x_0$, $x_1$). In this case i=0, so function $g_0$ ($x_0$, $x_1$) is computed.

In step S13, coefficient $c_i$ stored in the coefficient storage section 32 is read out, $c_i g_i$ ($x_0$, $x_1$) is computed, output value y is added to the result obtained from this computation, and this becomes the new output value y. On this occasion y=0, so the new output value y becomes $y = c_0 g_0 (x_0, x_1) = c_0$.

Then, in step S14, it is determined whether or not the counter value i is 20, and if i has not reached 20 the program goes to step S15, where i is incremented by 1 (at this time i=1), and then returns to step S12. Then, function $g_1$ ($x_0$, $x_1$) is computed in step S12, coefficient $c_1$ is read out of the coefficient storage section 32, is added to the output value y ($=c_0$) up to that point, and the new output value $y = c_1 x_0 + c_0$ is obtained.

After that, similar processes are reiterated, the operation which is expressed as equation (17) is executed, and output value y is found.

Figure 6:
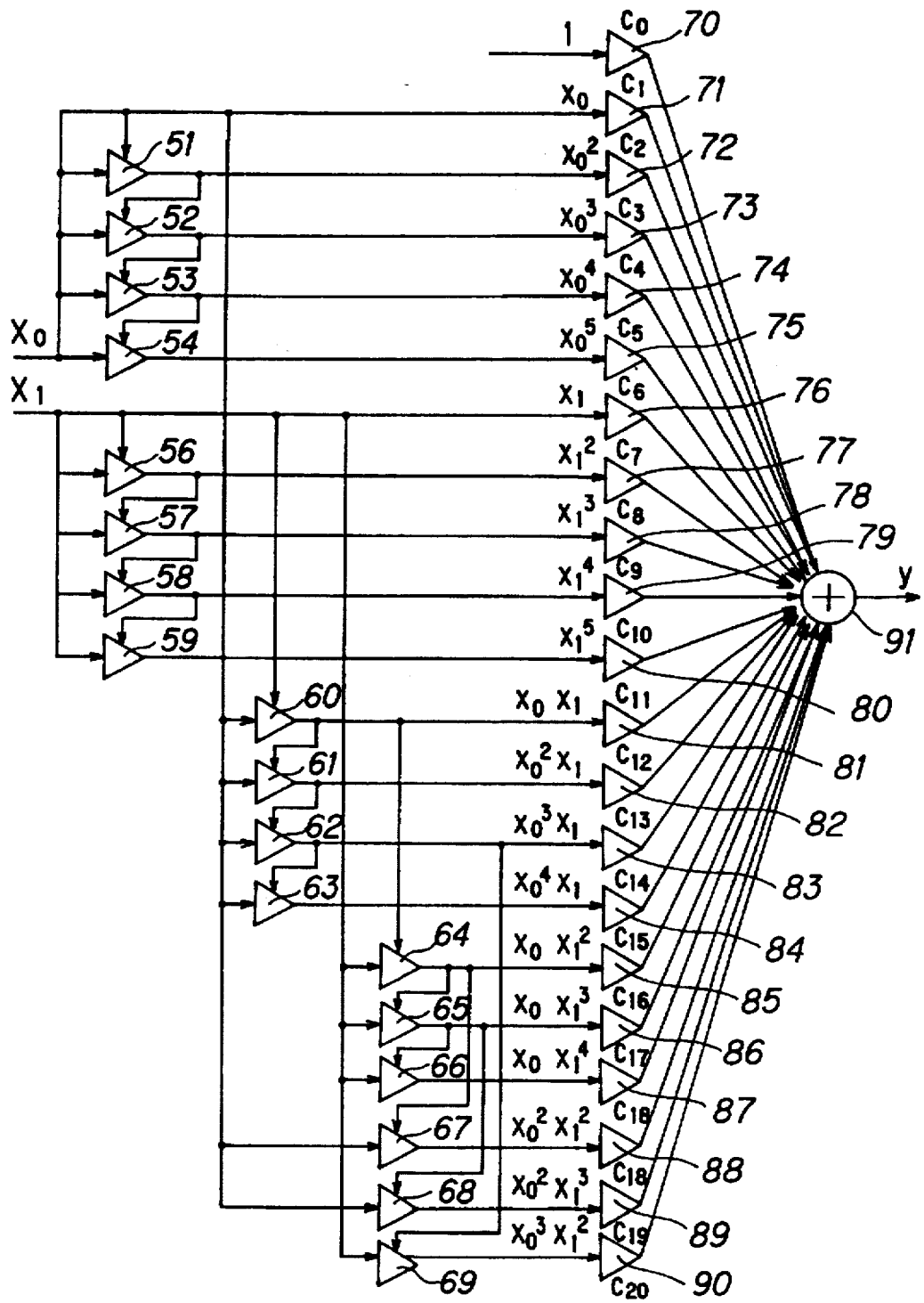
FIG. 6 is a structural view showing the process in FIG. 5.

The process in FIG. 5 described above is shown in block diagram form in FIG. 6. In this instance, input $x_0$ is input to multiplier circuits 51 to 54. Multiplier circuit 51 also receives input $x_0$ from another input terminal, multiplies the two $x_0$ inputs and outputs $x_0^2$.

The output $x_0^2$ from multiplier 51 is inputted to multiplier 52 which multiplies input $x_0$ and input $x_0^2$ together and outputs $x_0^3$.

The output $x_0^3$ from multiplier 52 is input to multiplier 53 which multiplies input $x_0$ and input $x_0^3$ together and then outputs $x_0^4$.

The output $x_0^4$ from multiplier 53 is input to multiplier 54 which multiplies input $x_0$ and input $x_0^4$ together and gives the output $x_0^5$.

In a similar manner, multiplier circuits 56 to 59 generate outputs $x_1^2$ to $x_1^5$ from input $x_1$ and output them.

Also, multiplier circuits 60 to 63 multiply inputs $x_0$ and $x_1$ and then output $x_0 x_1$, $x_0^2 x_1$, $x_0^3 x_1$, and $x_0^4 x_1$, while multiplier circuits 64 to 69 multiply the shown combinations of inputs $x_n$, $x_1$, $x_0 x_1$, etc., and output outputs $x_0 x_1^2$, $x_0 x_1^3$, $x_0 x_1^4$, $x_0^2 x_1^2$, $x_0^2 x_1^3$, and $x_0^3 x_1^2$.

Multiplier circuits 70 to 90 multiply inputs 1, $x_0$, $x_0^2$, $x_0^3$, $x_0^4$, $x_0^5$, $x_1$, $x_1^2$, $x_1^3$, $x_1^4$, $x_1^5$, $x_0 x_1$, $x_0^2 x_1$, $x_0^3 x_1$, $x_0^4 x_1$, $x_0 x_1^2$, $x_0 x_1^3$, $x_0 x_1^4$, $x_0^2 x_1^2$, $x_0^2 x_1^3$, and $x_0^3 x_1^2$ by coefficients $c_0$ to $c_{20}$ and output the results.

The adding circuit 91 sums the outputs from the multiplier circuits 70 to 90, and outputs this as the output y.

Figure 7:
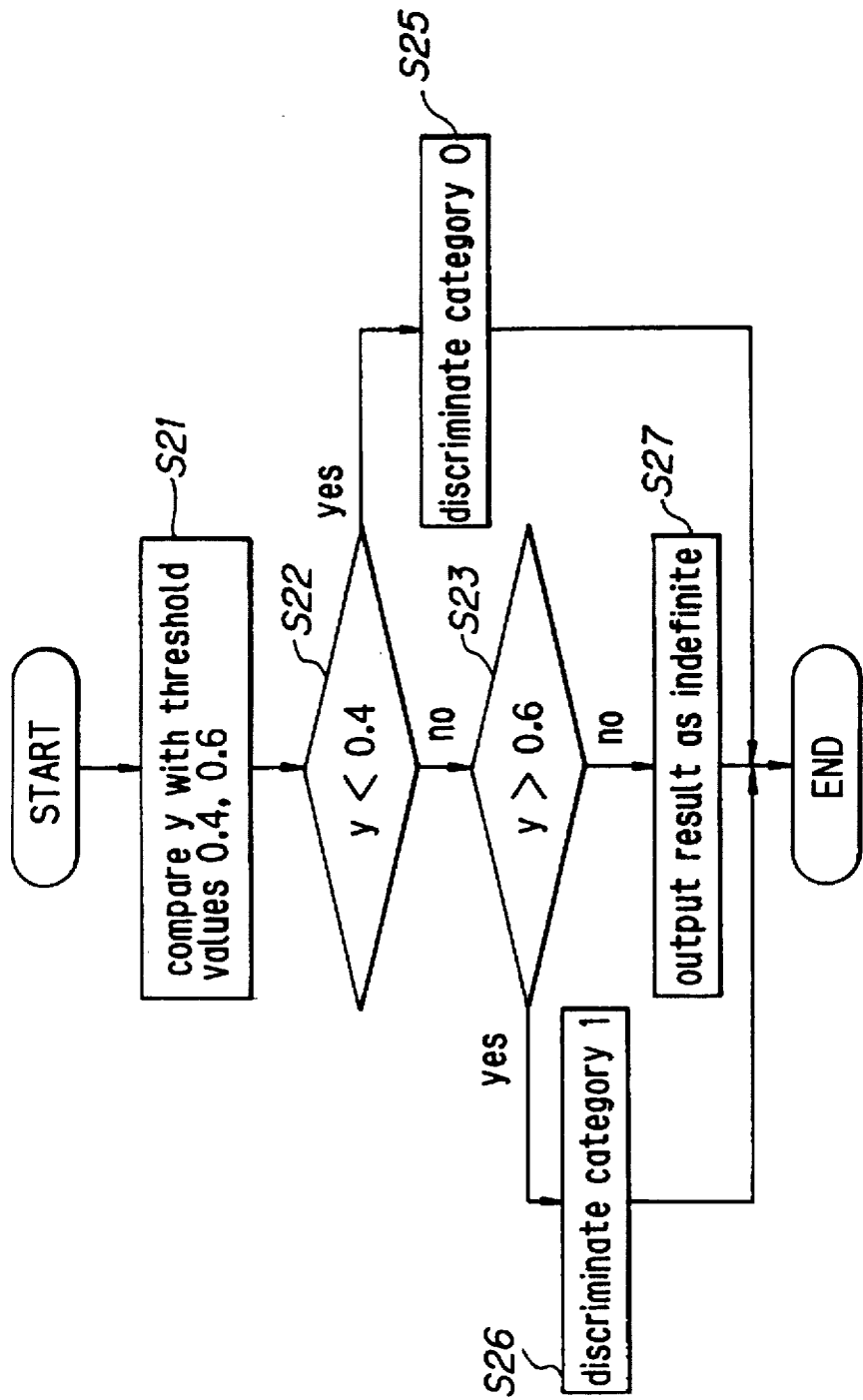
FIG. 7 is a flowchart showing how the discrimination unit carries out processing.

If output value y is found using the above described method, this output value y is provided to the discrimination unit 33 in FIG. 3. The discrimination unit 33 carries out processing in the way shown in the flow chart in FIG. 7.

Specifically, in the initial step 21, input value y is Compared with fixed threshold values 0.4 and 0.6. It is then determined whether or not value y is smaller than 0.4 or greater than 0.6.

Here, a teaching vector corresponding to class $c_0 c_1$ is set to 0, 1. It is not possible to discriminate what class data mapped in the neighborhood of 0.5 belongs to. Discrimination in this case can not be relied upon. Therefore, data attributes have been discriminated using threshold values of 0.4 and 0.6.

In step S22, if it is determined that computed value y is less than 0.4, the program advances to step S25, and the input data ($x_0$, $x_1$) is determined as belonging to category 0.

On the other hand, if computed value y is determined to be greater than 0.6 in step S23, the program advances to step S26, and the input data ($x_0$, $x_1$) is determined as belonging to category 1.

If the computed value y is determined to be greater than 0.4 but less than 0.6 in steps S22 and S23, the program advances to step S27 where input ($x_0$, $x_1$) is determined as not belonging to either category 0 or category 1 (indefinite).

Figure 8:
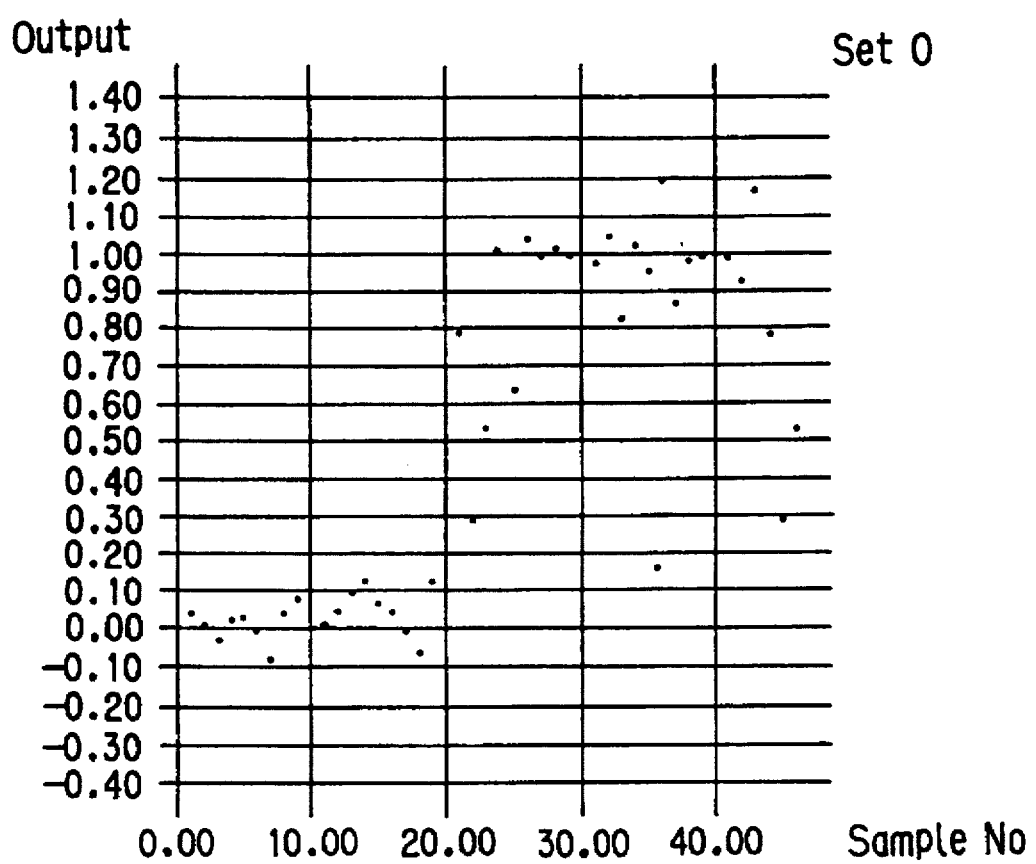
FIG. 8 is a diagrammatic representation of the output values obtained at the computation unit.

If the output values y, which are obtained as a result of operating on the forty six samples shown in table 1 and FIG. 2 in the GGM (Guaranteed Global Mapping) computation unit 31, are represented in diagrammatic form, they would appear as shown in FIG. 8. In FIG. 8, the abscissa axis represents the sample number of the forty six samples, while the ordinate axis represents the output value y for each sample.

As can be clearly seen from FIG. 8, the twenty samples in category $C_0$ approach teaching vector 0, while the 20 samples of category $C_1$ approach teaching vector 1. As can also be seen, the three samples that are there to cause confusion are correctly converted to intermediate values 0 or 1.

Figure 9:
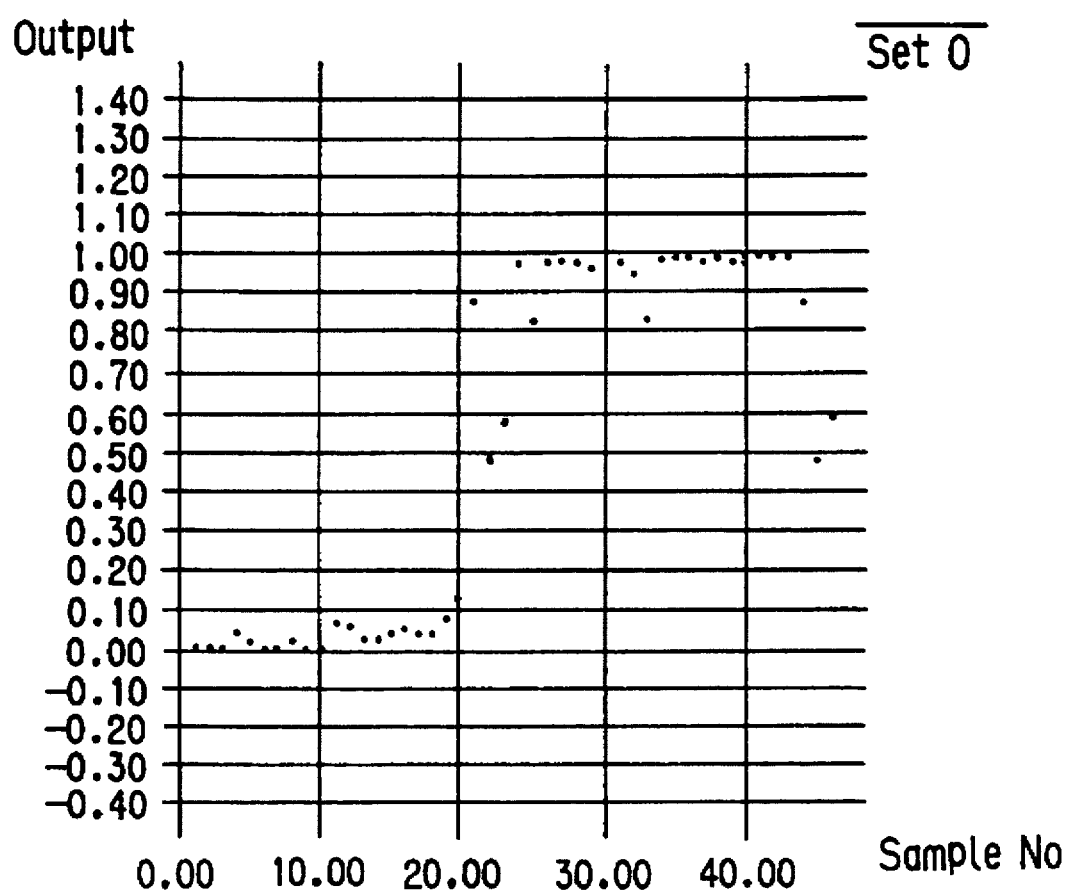
FIG. 9 is a view showing the conversion success of the neural network.
Figure 10:
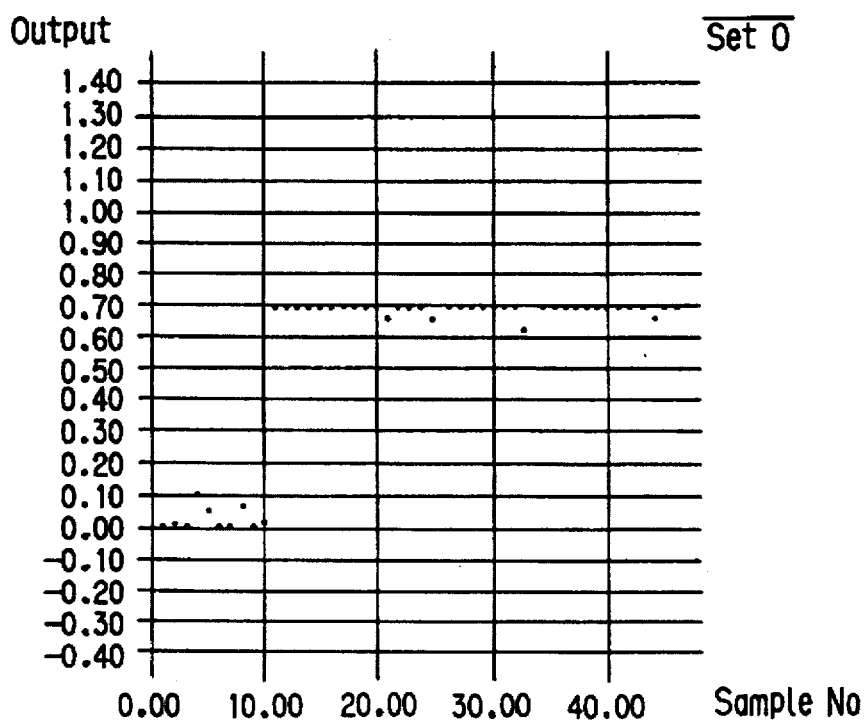
FIG. 10 is a view showing the conversion failure of the neural network.

To compare the method of the present invention with a prior art neural network map determining method, the number of parameters (combined weighting coefficient $\omega_i$) that must be determined by learning require five three layer neural networks having twenty one intermediate layer neurons, similar to the example described above, and the results processed using the same learning samples and teaching vectors are shown in FIG. 9 and FIG. 10. FIG. 9 represents an example of conversion success by the neural network, and FIG. 10 represents failure by the neural network.

In the case of a neural network, the initial values were converted to random numbers and learning was executed ten times. During these ten iterations of learning, the result as shown in FIG. 9 was obtained eight times, and the result shown in FIG. 10 was obtained twice. These latter two times clearly show the case of having fallen into the local minimum.

If the successful example of FIG. 9 is compared with the result of the embodiment in FIG. 8 (GGM), it appears, at a glance, that the case with the neural network (FIG. 9) errs less from the teaching vector. However, the neural network situation here is attributable to the fast that there is a tendency for both ends to stick at 0 or 1 because a Sigmoid function is input to the output layer.

Figure 11:
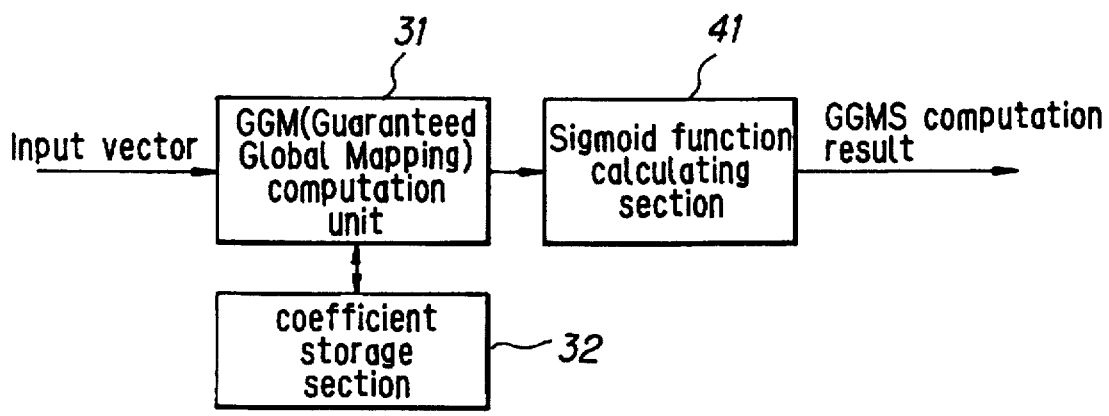
FIG. 11 is a block view showing how a Sigmoid function is applied to the map (GGM) output of the present invention.

To summarize, in order to accurately evaluate the superiority of the map, an inverse function of the Sigmoid function is applied to the output of the neural network, and a comparison made with the map (GGM) output of the present invention, or, conversely, as shown in FIG. 11, a Sigmoid function is applied to the map (GGM) output of the present invention using the Sigmoid function computing section 41, and there is no need to compare with the output of the neural network.

From now on, as shown in FIG. 11, the map for the Sigmoid function applied to the GGM output will be referred to as GGM S (Guaranteed Global minimum Mapping with Sigmoid).

Figure 12:
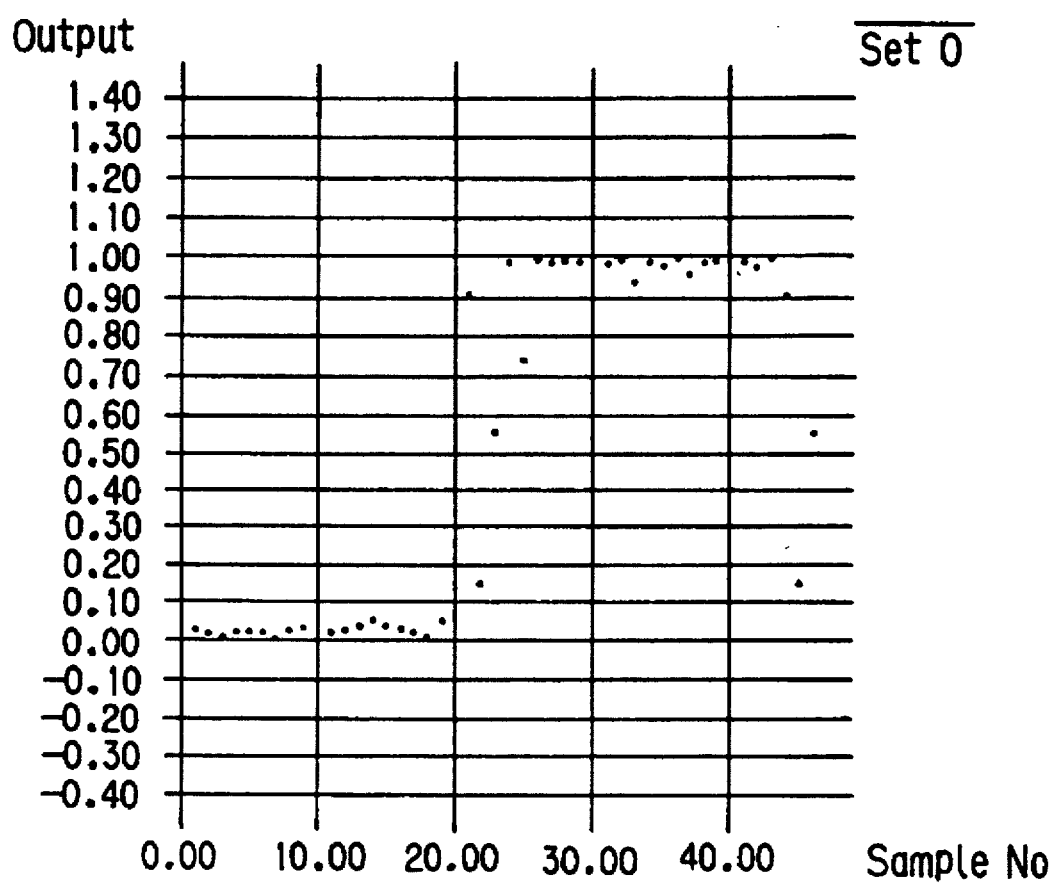
FIG. 12 is a view showing the result of the Sigmoid function applied to the result in FIG. 8.

FIG. 12 shows the result of a Sigmoid function applied to the result in FIG. 8. The result in FIG. 12 shows that also with respect to errors, when compared with the neural network (FIG. 9), GGM can lead to results which are just as good.

The Sigmoid function is a single variable monotonous function having the form s $(x)=1/(1+\exp(-x))$, and if an inverse function log $(x/(1-x))(0<x<1)$ exists, there is no essential difference between the GGM result and the GGMS result. If a result which sticks at 0 or 1 is desirable as in with a neural network, then GGMS should be used, while in any other situation GGM should be used.

In this embodiment, a monomial has been employed as the function $g_i(x)$. However, the map for which there are fewer errors may also be decided upon so that there is a degree of freedom in selecting the most suitable function taking into consideration the features of the distribution of the learning samples etc. providing this is done within the basic structure of the present invention.

A determination apparatus with a much-enhanced performance when compared with the neural network determination apparatus for the prior art can therefore be realized by using a structure where the coefficients are decided in this way.

The characteristics of the aforementioned GGMs and neural networks are compared in table 2.

TABLE 2

|  | neural network | GGM |
| --- | --- | --- |
| expression of arbitrary consecutive maps | possible by increasing intermediate layers | possible if the numbers and form of function $g_i(x)$ can be appropriately chosen |
| map expression performance for a fixed scale (degree of freedom) | only degree of freedom of combined weighting coefficient $w_i$ value | degree of freedom of coefficient $c_i$ value and degree of freedom of selection of function $g_i(x)$ |
| characteristics given to maps | teaching vectors | teaching vectors |
| free parameter obtained | $\omega_i$ | $c_i$ |
| evaluation function minimum error | not guaranteed (problems with initial value) | guaranteed (initial values not a problem) |
| learning method map structure evaluation function | back propagation | linear equation |

As shown above, in a neural network, arbitrary consecutive maps can be expressed by increasing the neuron elements in the intermediate layer. However, with GGM, arbitrary consecutive maps can be expressed by the discretionary selection of the function $g_i(X)$.

Also, in a neural network, the free parameters are the connection weighting coefficient $\omega_i$ while in the GGM these are the coefficient $c_i$. However, in GGM there is a degree of freedom when selecting the shape of the function $g_i(X)$. Therefore, in GGM there are two kinds, which gives a large degree of freedom in relation to the map expression performance.

Also, with a neural network, problems with initial values have to be compensated for so as to make the evaluation function a minimum. However, with GGM there is no problem with the initial values so that it is possible to make the error for the evaluation function a minimum reliably. This is because the evaluation function (11) does not depend on the base function with regards to the coefficient for each component function and this becomes a secondary function. i.e. this becomes a convex parabolic surface with respect to the coefficient space.

Further, in the neural network, back propagation is used as the learning method while with GGM, learning is carried out by solving linear equations.

Also, the map structure in a neural network is of a complicated structure in order to accommodate the building in of the Sigmoid function. Conversely, with Guaranteed Global minimum Mapping, the structure is simply the product sum of the function and coefficient.

In the case of either neural networks or GGM the adding of characteristics to the map is carried out using teaching vectors. In either case, the function which makes the square of the error between the output and the teaching vector is used as the evaluation function.

In this embodiment, the case has been shown for two-dimensional learning data as an example of an application of GGM in determination apparatus. However, completely the same structure of mapping apparatus can be used with determination apparatus for data for a larger number of dimensions or for computing mapping conditions using conditions control apparatus for outputting a control signal from input parameters.

In the aforementioned embodiment, in order to obtain the map F i.e. the coefficient $c_{lm}$, the partial differential clm is obtained (13) by obtaining the partial differential using the coefficient clm in the evaluation function J expressed in equation (7) or by solving the simultaneous equation (normal equation) 16. The solution decided in this way is limited by the Jacob matrix for this simultaneous equation not being unique (rank omission) so that a value which is definitely the minimum value for J is obtained. It can therefore be said that the aforementioned embodiment shows the simplest and most superior method.

However, in order to carry out the operations in (9) and (10) with this kind of deciding method for the coefficients, it is necessary to store each item of data in temporary memory. If the base function $g_{lm}$ for each of the component functions for the map is then increased, the number of the items $\alpha_{qmij}$ and $\beta_{qmi}$ in equations (9) and (10) increase. This causes the following problems.

(1) long periods of time are spent deciding on $\alpha_{qmij}$ and
(2) a sufficient region of storage is necessary for the operation.
(3) additional learning (map adaptation) carried out as required is difficult (it is necessary to obtain $E\{X \epsilon S_q\}\{g_{im}(X)g_{im}(X)\}$ and $E\{X \epsilon ES_q\}\{g_{im}(X)\}$ once more and solve the regular equation).

A method where the map is decided each time the data is inputted has therefore been considered. In order to do this, a trajectoryal determination for the mechanical system of the mapping analysis is to be formulated for the mapping decision.

With regards to this kind of successive method, by using learning data one item at a time, the mapping is revised so that the evaluation function is reduced. Revising the mapping means revising the coefficients. i.e. the string of coefficients $\{c_i(n)\}_{n=0, 1, \ldots}$ referred to as $C_i(0)$–$C_i(1)$ is obtained. The deciding of Ci(N) (exactly n→∞) when sufficient revision has been carried out then means that the coefficients to make the evaluation function a minimum have been obtained.

The evaluation function in the above is expressed by equation 7 and this equation can be re-written in the following way.

$$J = \sum_{q=0}^{Q-1} \left\{ \sum_{X \epsilon S_q} \frac{1}{|S_q|} \right\} \left\{ \sum_{m=0}^{M-1} (f_m(X) - t_{qm})^2 \right\} \quad (18)$$

Single parameter analysis U for the map F can therefore be considered in the following way.

$$U: R^N \times R \to R^M$$

$$U(x, t) = (f_0(x, t), \ldots, f_{M-1}(x, t)) \quad (19)$$

i.e. $R^M$ is expressed as a combination (accumulated value) of the x factor of $R^N$ and the 1 factor of R.

Also, $f_m(x, t)$ in equation (19) can be expressed by the following equation.

$$f_m(x,t) \stackrel{\text{def}}{=} \sum_{l=0}^{Lm-1} c_{lm}(t) g_{lm}(x) \quad (20)$$

J (the function for t) can then be obtained for this analysis U by the following equation.

$$J = \frac{1}{2} \sum_{q=0}^{Q-1} E\{XES_q\} \left\{ \sum_{m=0}^{M-1} (f_m(x,t) - t_{qm})^2 \right\} \quad (21)$$

The following mechanical system can then be considered. In the following, (½)J is taken to be J for the sake of simplicity.

Equation (22) is then derived for deciding the map so that the evaluation function can be reduced and the learning data be used one item at a time.

$$\frac{dc_{lm}}{dt} = -\frac{\partial J}{\partial c_{lm}}$$

$$0 \leq l \leq Lm-1, 0 \leq m \leq M-1 \quad (22)$$

According to this dynamic system, J does not increase when U(i.e. the coefficient c(t)) moves.

i.e. J is therefore shown to be non-increasing in the following equation.

$$\frac{dJ}{dt} \leq 0 \quad (23)$$

The necessary sufficient conditions to achieve the coding of this equation (23) are therefore as follows.

$$\frac{\partial J}{\partial c_{lm}} = 0 (\forall l, \forall m) \quad (24)$$

In reality, as found through computations, the following equation is fulfilled.

$$\frac{dJ}{dt} = \sum_{m=0}^{M-1} \sum_{l=0}^{Lm-1} \frac{\partial J}{\partial c_{lm}} \frac{dc_{lm}}{dt} = -\sum_{m=0}^{M-1} \sum_{l=0}^{Lm-1} \left( \frac{\partial J}{\partial c_{lm}} \right)^2 \quad (25)$$

As becomes clear from the above equation, the necessary sufficient conditions for coding to be fulfilled are as follows.

$$\frac{\partial J}{\partial c_{lm}} = 0 (\forall l, \forall m) \quad (26)$$

U then becomes the minimum value for J when t becomes sufficiently large. i.e. the map which makes J a minimum (it's coefficients) is determined in the following way.

$$\lim_{t \to \infty} U \quad (27)$$

$$\left( \lim_{t \to \infty} c_{lm}(t) \right)$$

In this way, in order to determine the map, it is preferable if the trajectory (curve) of the mechanical system (differential equation) is decided.

The trajectory (curve) of the aforementioned mechanical system (differential equation) is not obtained via direct analysis, but is instead obtained sequentially for each item of data.

$$\frac{dc_{lm}}{dt} = -\frac{\partial J}{\partial c_{lm}} \quad (28)$$

The following equation is then obtained by approximating $dc_{kn}/dt$ occurring in the equation for the aforementioned mechanical system to $(c_{kn}(t+h) - c_{kn}(t))/h$.

$$c_{kn}(t+h) - c_{kn}(t) = -h \frac{\partial J}{\partial c_{kn}} \quad (29)$$

The following equation is then fulfilled, $$\frac{\partial J}{\partial c_{kn}} = \sum_{q=0}^{Q-1} \left\{ \sum_{X \in S_q} \frac{1}{|S_q|} \sum_{m=0}^{M-1} (f_m(x,t) - t_{mq}) \frac{\partial}{\partial c_{kn}} f_n(x,t) \right\} = \quad (30)$$

$$\sum_{q=0}^{Q-1} \left\{ \sum_{X \in S_q} \frac{1}{|S_q|} \{(f_n(x,t) - t_{nq}) g_{nk}(x)\} \right\}$$

The next equation is then attained, $$D_{nq}(x, t) = f_n(x, t) - t_{nq} \quad (31)$$

And the following sequential learning limits are deduced.

$$c_{kn}(t+h) = c_{kn}(t) - h \sum_{q=0}^{Q-1} \left\{ \sum_{X \in S_q} \frac{1}{|S_q|} D_{nq}(x,t) g_{nk}(x) \right\} \quad (32)$$

This equation can then be transformed in the following manner.

$$|S_q| = C_q/N \equiv \sum_{q=0}^{Q-1} C_q \quad (33)$$

Now, when $S_q \in X(q)$ is taken to be the ith data, the following equation is attained.

$$c_{kn}(t+(i/N)h) = c_{kn}(t+((i-1)/N)h) - (h/c_q) D_{nq}(x(q), t) g_{nk}(x(q)) \quad (34)$$

The map (coefficients) can then be updated in the following way.

$$c_{kn}(t+1) = c_{kn}(t) - \epsilon D_{nq}(x, t) g_{nk}(x) \quad (35)$$

(where $\epsilon$ is a constant which becomes small).

i.e. when the (t+1)th item of learning data is taken to be x (:i.e. $x \in S_q$), the coefficients ckn for the map are updated according to equation (35) with respect to each item of k and n, A determination for the desired map can then be made using this method. This means that amendments are made simple since this method can be used for updating the coefficients for the map as necessary with respect to the map which has been obtained once (after all the data has been stored once, there is a map obtained using a technique where all the items are gathered together and then processed and a map obtained by a technique where the data is processed sequentially.

Figure 13:
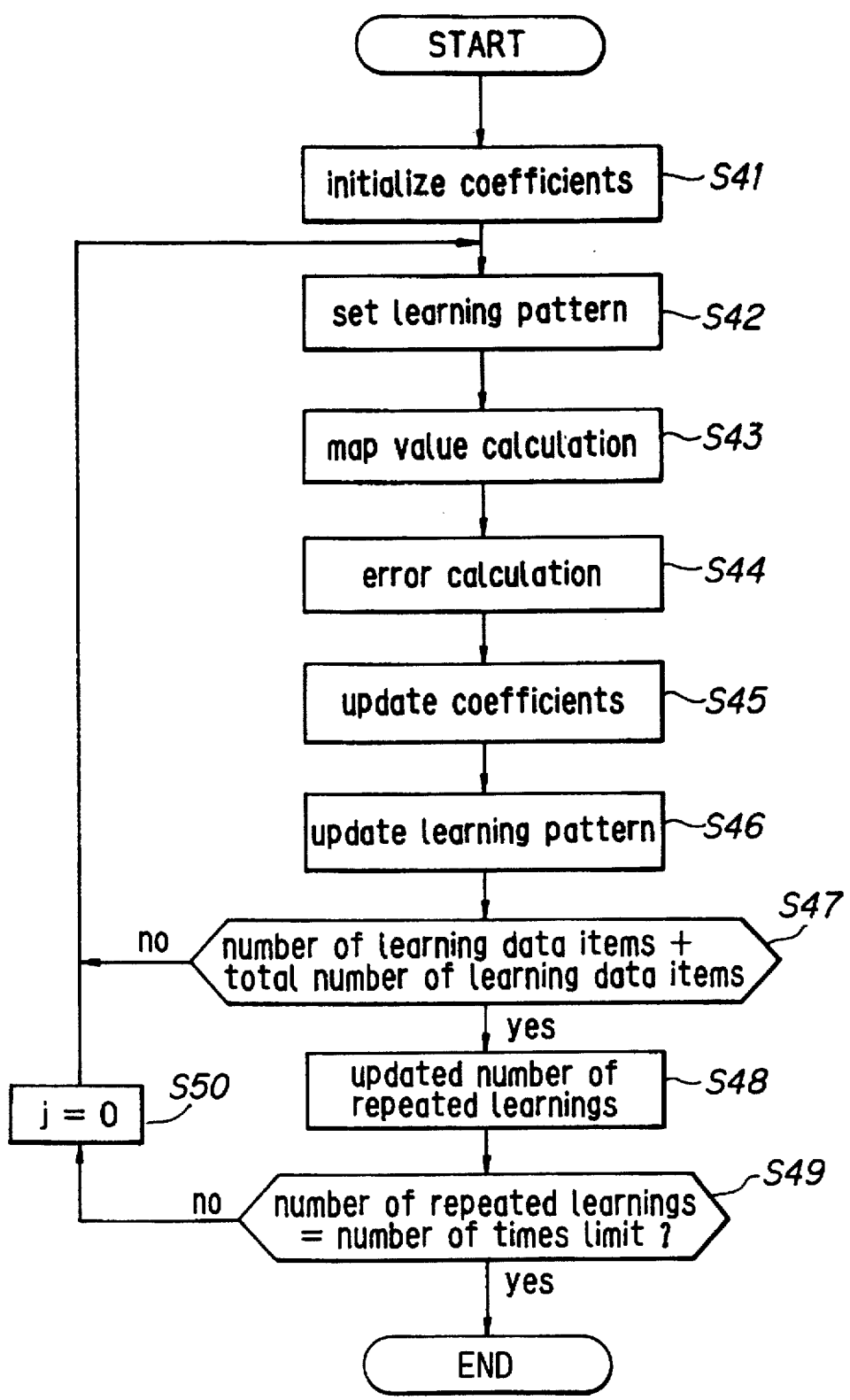
FIG. 13 is a flowchart showing the coefficient updating process.

The details of the technique for deciding of the map F (the deciding of the coefficients $c_{lm}$) where the data is processed sequentially in accordance with the above theory will now be described with reference to FIG. 13.

Now, taking F(i) as the ith updated set-up map, F(i)(x) is defined in the following way.

$$F(i)(x) = (f_0(i)(x), \ldots, f_{M-1}(i)(x)) \quad (36)$$

$f_m(X)$ for $1 \leq m \leq M-1$ is then given by the following equation.

$$f_m(X) = \sum_{l=0}^{Lm-1} C_{lm}(i) g_{lm}(X) \quad (37)$$

The whole of the learning data (characteristic vectors) is then shown by the following equation.

$$D = \{d_j; j=1, \ldots, N\} \subset R^N \quad (38)$$

The teaching vector T corresponding to each of the categories q(q=1, . . . Q-1) is expressed by $$T = (t_{q0}, \ldots t_{qM-1}).$$

The limit on the number of times the learning is repeated is then taken to be S.

The initial processing for the coefficients is carried out in step S41. i.e. the respective variables are taken to be i=0, j=0 and s=0, and the coefficient $c_{lm}(0)$ ($1 \leq m \leq M-1$, $0 \leq 1 \leq Lm-1$) is initialized as a random number of a small value.

The learning data is then installed in step S42. i.e. the learning data is taken to be $d_j \in S_q$ (at this moment it is $d_0$).

Calculations for the map value are then carried out in step S43. i.e.

$$F(i)(d_j) = (f_0(i)(d_j), \ldots, f_{M-1}(i)(d_j)) \quad (39)$$

is calculated.

The error is then computed in step S44. i.e. the following equation is computed for each m.

$$D_{mq}(i)(d_j) = f_m(i)(d_j) - t_{mq} \quad (40)$$

In step 45, the coefficients are updated. i.e. the following equation is calculated.

$$c_{lm}(i+1) = c_{lm}(i) - \epsilon D_{qm}(d_j) g_{lm}(d_j) \quad (41)$$

The learning data is then updated in step 46. i.e. the following data $d_{j+1}$ is taken as the data $d_j$.

The process then goes on to step S47 and the learning data j is compared with the learning data total N. If j is less than N, step S42 is returned to. If this is not the case, the process is repeated.

In the case where j=N, the process goes from step S47 to step S48 and the number of times the learning has been repeated is updated (incremented) i.e. taken to be s=s+1.

Then, in step S49, the number of repeated leanings s and the limit on the number of times S are compared. If s is less than S, step S42 is returned to after j is put to zero in step S50, If this is not the case the process is repeated. The process then ends when s=S.

In the case where the map is adapted, in step S41, rather than initializing the coefficient $c_{lm}$ with a small value random number, a prescribed coefficient (value) of $$c_{lm}(0)(1 \leq m \leq M-1, 0 \leq l \leq Lm-1)$$

may be adopted for a pre-decided map.

The determination of the set-up map while the map deciding method is being utilized is important. In the aforementioned first embodiment, a monomial which formed the base component function was obtained by computing a correlation function using global learning data (characteristic vectors), A map was then set up from a polynomial possessing each component generated (shown by linear connection) using this monomial. i.e. as shown in the following, within the set up method for the component function, the component "each category q ($0 \leq q \leq Q-1$) is taken as the global learning data and the transform $x_q$-x, $P_j$, $k, l$-$P_{k,l} k_{q-k}, l_{q-l}$, i.e. the map is determined by removing the concept of the category.

With respect to this, in either the first or the second embodiment, rather than using the global learning data (characteristic vectors), the category divided learning data may be used: Polynomials generated from monomials determined using the correlation functions for these items are then set up as the component functions corresponding to these categories. In this way, a degree of discrimination can be included in setting up the map itself.

Figure 14:
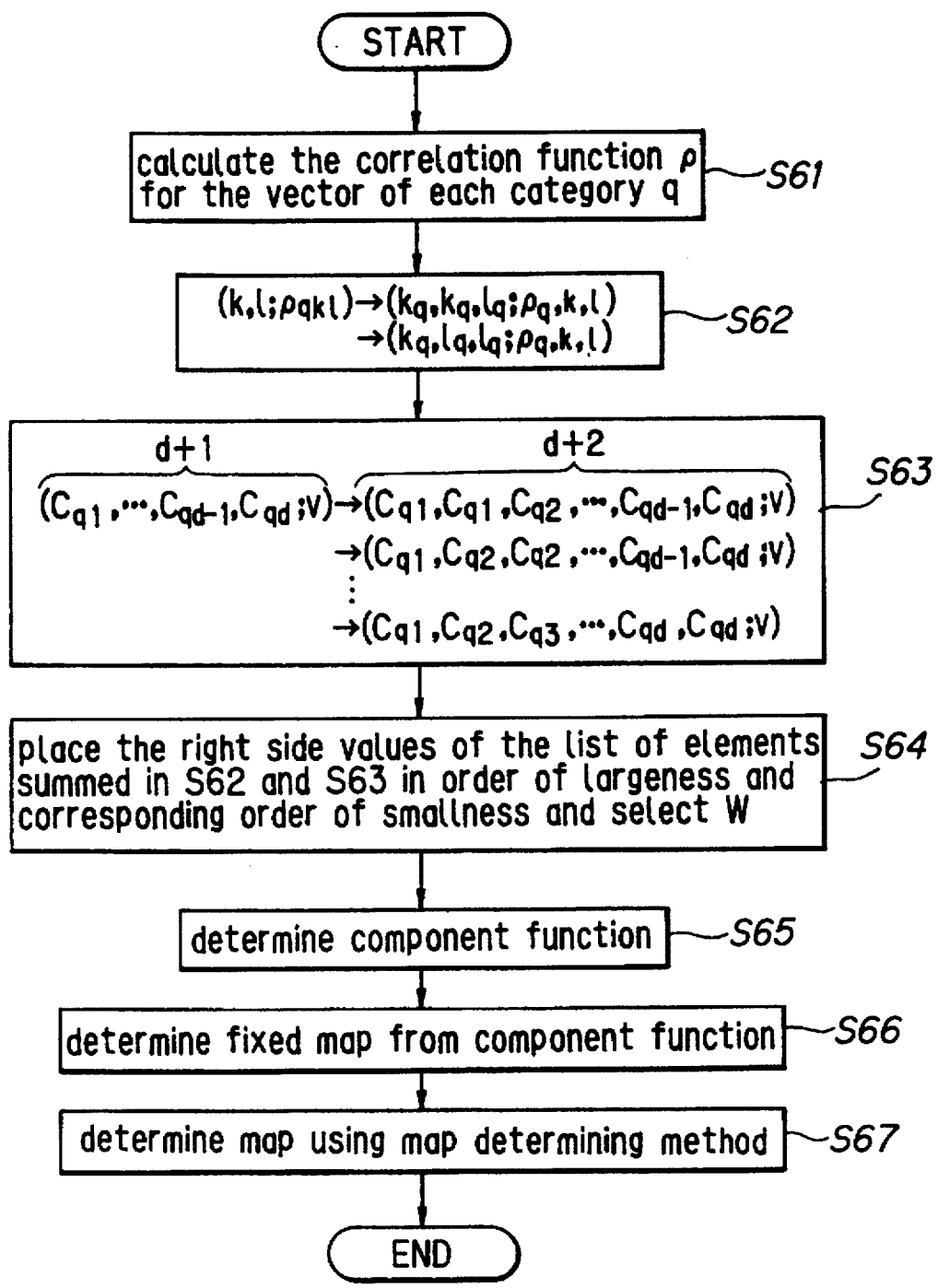
FIG. 14 is a flowchart showing the process to include a degree of discrimination in setting up the map itself.

Next, this process will be described with reference to the flowchart in FIG. 14. First, in step S61, the correlation function $p_{q,k,l}$ ($0 \leq k \leq l \leq N-1$) expressed by the following equation is computed for $x_q (= (x_{q0}, \ldots, x_{qN-1}))$ with regards to each of the categories $q$ ($0 \leq q \leq Q-1$).

$$p_{q,k,l} = \frac{\sum_{X_q \in S_q}(X_{qk} - \mu_k)(X_{ql} - \mu_l)}{\left(\sum_{X_q \in S_q} X_{qk} - \mu_k\right)^{1/2} \left(\sum_{X_q \in S_q} X_{ql} - \mu_l\right)^{1/2}} \quad (42)$$

Here, $$\mu_k = \frac{\sum_{X_q \in S_q} X_{qk}}{|S_q|} \quad (0 \leq k \leq N-1) \quad (43)$$

average value of the k component.

Here, $p_{qjk}$ expresses the correlation function for the k coordinate and the l coordinate obtained using the learning data belonging to the category q.

Next, in step 562, with respect to k and l the next corresponding relationship can be considered.

$$p_{q,k,l} \Rightarrow (k_q, l_q; p_{q,k,l}) \quad (44)$$

In the present invention, the base function is taken giving priority to the monomial made from a combination of coordinate components so that the correlation function becomes large. The coordinate direction in which the correlation function becomes large can therefore easily be shared which means it can be considered as a base function.

The following combination is then made.

$$(k,l; p_{q,k,l}) \rightarrow (k_q, k_q, l_q; p_{q,k,l}) \quad (45)$$
$$\rightarrow (k_q, l_q, l_q; p_{q,k,l})$$

This making of a combination, i.e. obtaining of a base function is so that the kind of secondary equation given by $x_k$ and $x_l$ can be sent to the third, fourth and so on, order so as to give a higher degree of correlation.

The following process is then repeated in step S63 from when d=3 until d=$D_q$, i.e. the time from the (d+1)th group (cq1, cq2, ..., cqd;v) until the following (d+2)th group is made. Here, Dq is the size of the pattern set, which is decided beforehand while being adjusted to the realities of the processing time. Now, a more detailed explanation will be given. The map coefficients are made to correspond to the number of base functions. Therefore, while the map is being incorporated into the system, it is necessary to store the coefficients in memory. Also, increasing the base function means that the number of map layers increases or the processing time (mapping time) increases. The term Dq should therefore be selected so that there is sufficient memory space for the system in accordance with the permitted processing time.

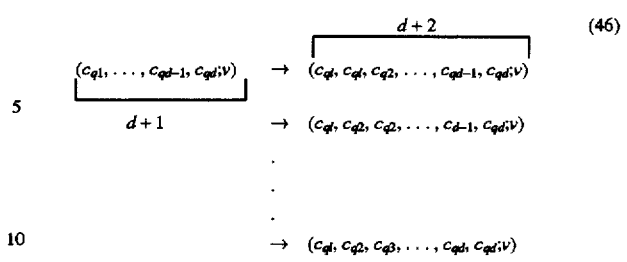

Also, the computation of equation (46) is the process in equation (45) continued a+2 times.

(Setting d=2, $c_{q1}=k_{q1}$, $c_{q2}=l_{q1}$ and $v=r_{j,k,l}$ will give equation (45)).

In step S64, the groups made in step S62 and step S63 and the added list with (1), (kq, 1), ($0 \leq k \leq N$) are arranged in order of magnitude from the right-end value (the value for v occurring in ( ... ;v)) as well as in order of smallness of number of groups. W items are then selected taking into account the scale of the pattern set and the realities of the processing time. It does not present a problem if this item W is changed for each component function. Here, V being large means that the correlation function is also large. Also, the group number being small means that the secondary for the monomial is also small. Further, the choice of a monomial with a small secondary for the base function depends on Stingy's principle. (When considering the generalization of mapping, it is preferable, and keeps the equations simple, if the number of items is kept low).

Also, an example of the kind listed above will now be shown below. In this example 48 dimensional speech characteristic vectors i.e. this corresponds to the case for a 48 dimensional input space.*

| | |
|---|---|
| (1,1; $\rho_{q11}$) | |
| (1,2; $\rho_{q12}$) | (1,2,1,1; $\rho_{q12}$) |
| ... | (1,2,1,2; $\rho_{q12}$) |
| (48,48, $\rho_{q4848}$) | (1,2,2,2; $\rho_{q12}$) |
| (1,1,1; $\rho_{q11}$) | ... |
| (1,2,1; $\rho_{q12}$) | (48,48,48,48; $\rho_{q4848}$) |
| (1,2,2; $\rho_{q12}$) | |
| ... | |
| (48,48,48; $\rho_{q4848}$) | |
| (1,1,1,1; $\rho_{q11}$) | |

In step S65, with regards to the W groups selected, the monomial is determined in the following way.

$$(c_{qi(1)}, c_{qi(2)}, \ldots, c_{qi(l)}) \rightarrow x_{i(1)} x_{i(2)} \cdots x_{i(l)}$$

Here, $$0 \leq l \leq N-1, 1 \leq i(1) \leq i(2), \ldots, \leq i(l).$$

The items generated in the above way are then decided upon as the following kind of polynomials to be taken as the component function $f_q$. The aforementioned component function is then determined accordingly with respect all of the categories from $1 \leq q \leq Q-1$).

$$\sum_{i(1), i(2), \ldots, i(l)} x_{i(1)} x_{i(2)} \cdots x_{i(l)} \quad (47)$$

Next, in step 66, the set up map is decided depending on these component functions and then in step S67 the map is then determined in accordance with the preceding or following map determination method.

In this way, by setting up a component function corresponding to the category, the features of the data for each category can be reflected in the functions more effectively and a more accurate discrimination can be obtained. i.e. the discrimination level is raised.

Also, an example of the kind listed above will now be shown below. In this example 48 dimensional speech characteristic vectors, i.e. this corresponds to the case for a 48 dimensional input space, are considered.

Now, this sequential method will be applied to the example in the first embodiment.

First, preparations are made as follows.

$$f(i): \Omega_N \to \Omega_M$$

taking the ith updated set-up map $$f(i)(x_0, x_1) = \sum_{l=0}^{20} c_l(i) g_l(x_0, x_1)$$

Here, $g_{20}(x_0,x_1)=x_0^3 x_1^2$, $g_{19}(x_0,x_1)=x_0^2 x_1^3$, $g_{18}(x_0,x_1)=x_0^2 x_1^2$, $g_{17}(x_0,x_1)=x_0 x_1^4$, $g_{16}(x_0,x_1)=x_0 x_1^3$, $g_{15}(x_0,x_1)=x_0 x_1^2$, $g_{14}(x_0,x_1)=x_0^4 x_1$, $g_{13}(x_0,x_1)=x_0^3 x_1$, $g_{12}(x_0,x_1)=x_0^2 x_1$, $g_{11}(x_0,x_1)=x_0 x_1$, $g_{10}(x_0,x_1)=x_1^5$, $g_9(x_0,x_1)=x_1^4$, $g_8(x_0,x_1)=x_1^3$, $g_7(x_0,x_1)=x_1^2$, $g_6(x_0,x_1)=x_1$, $g_5(x_0,x_1)=x_0^5$, $g_4(x_0,x_1)=x_0^4$, $g_3(x_0,x_1)=x_0^3$, $g_2(x_0,x_1)=x_0^2$, $g_1(x_0,x_1)=x_0$, $g_0(x_0,x_1)=1$ Also, all of the learning data is put in equation 1 in the first embodiment.

$$\{(d0_n, d1_n), n; \text{Sample No } (1 \leq n \leq 46)\}$$

Then, the teaching vectors for the categories C0 and C1 are taken to be t0=0 and t1=1. The limit on the number of times the learning is repeated is then taken to be S=50.

1. Start.

$$i=0, n=1, s=1$$

2. coefficient initialization.
3. install learning data
4. compute map value. i.e. calculate value for:

$$f(i)(d0_n, d1_n) = \sum_{l=0}^{20} c_l(i) g_l(d0_n, d1_n)$$

5. Calculate error $(d0_n, d1_n) \in C_0$, if then, $D(i)=f(i)(d0_n, d1_n)-t_0$ $(d0_n, d1_n) \in C_1$, if then, $D(i)=f(i)(d0_n, d1_n)-t_1$ 6. update coefficients using $$c_k(i+1) = c_k(i) - \epsilon D(i) g_k(d0_n, d1_n)$$

(where, for example, s is taken to be 0.001)
7. update learning data $$n=n+1$$

8. learning data number: learning data total
If n is less than 47 go to 2
if n=47 go to 9.
9. update number of repeated learnings $$s=s+1$$

10. number of repeated learnings: limit
if s is less than 50
put n=0 and go to 2
if s=50 and go to the next
11. end.

In the above way, according to the present invention, the following effects are obtained.

(1) the minimum error (global minim) is guaranteed, (2) a greater degree of freedom is possible in the selection of the function glm(X).

(3) in the case which uses the algebraic method (the method where equations are solved), initial value problems are eliminated, repeat learning is not necessary and high speed learning is therefore possible.

What is claimed is:

1. In a data processing system which generates output vectors, representing output data, of a predetermined number of dimensions with respect to input vectors, representing input data, of a prescribed number of dimensions, a map determination method for building a map F from N-dimensional weighted vector space $\Omega_N$ to M-dimensional weighted vector space $\Omega_M$ comprising:

a first step of computing in a processor L complete component functions $g_{lm}(X)$ determined from the distribution of samples grouped into Q categories in the N-dimensional weighted vector space $\Omega_N$;

a second step of computing in a processor the function $f_m(X)$ for the mth component of the map F as the linear sum of the function $g_{lm}(X)$ and the Lm coefficients $c_{lm}$;

a third step of computing in a processor a prescribed evaluation function J based on Q teaching vectors ($t_{a0}$, $t_{a1}$, $t_{a2}$, ..., $t_{a(m-1)}$) relative to the Q categories over M-dimensional weighted vector space $\Omega_M$, and computing the coefficient $c_{lm}$ which makes the evaluation function J a minimum; and a fourth step of storing the coefficient $c_{lm}$ obtained in the third step in a digital memory.

2. A map determination method for use in a data processing system according to claim 1, wherein the evaluation function J is expressed by:

$$J = \sum_{q=0}^{Q-1} E\{X \in S_q\} \cdot \left\{ \sum_{m=0}^{M-1} (f_m(X) - t_{qm})^2 \right\}$$

when $E\{X \in S_q\} \cdot \{f(X)\}$ is computed across all elements of the teaming samples $S_q$ to obtain the desired value for the function f(X).

3. A map determination method for use in a data processing system according to claim 2, wherein in the third step, the partial differential is found for the evaluation function J using the coefficient $c_{lm}$, and the coefficient $c_{lm}$ is then found by making the partial differential zero in order to make the evaluation function J a minimum.

4. A map determination method for use in a data processing system according to claim 3, wherein the function $g_{lm}(X)$ is a variable monomial.

5. A map determination method for use in a data processing system according to claim 3, the third step comprising:

a step of computing $$\alpha_{mij} = \sum_{q=0}^{Q-1} E\{X \in S_q\} \cdot \{g_{im}(X) \cdot g_{jm}(X)\}$$

a step of computing $$\beta_{mi} = \sum_{q=0}^{Q-1} t_{qm} \cdot E\{X \in S_q\} \cdot \{g_{im}(X)\}$$

and a step of computing $$\sum_{j=n}^{Lm-1} \alpha_{mij} \cdot c_{jm} - \beta_{mi} = 0$$

to the coefficient $c_{jm}$.

6. A map determination method for use in a data processing system according to claim 2, wherein the coefficient $c_{lm}$ suitable for use in the steepest descent method for the evaluation function J is obtained.

7. A map determination method for use in a data processing system according to claim 2, further comprising a step giving the Sigmoid function with respect to the map output for the function $f_m(X)$ obtained as a result of having obtained the coefficient $c_{lm}$.

8. In a data processing system which generates output vectors, representing output data, of a predetermined number of dimensions with respect to input vectors, representing input data, of a prescribed number of dimensions, a map determination method for building a map F from N-dimensional weighted vector space $\Omega_N$ to M-dimensional weighted vector space $\Omega_M$ comprising:

- a first step of computing in a processor L complete component functions $g_{lm}(X)$ determined from the distribution of samples grouped into Q categories in the N-dimensional weighted vector space $\Omega_N$;
- a second step of computing in a processor the function $f_m(I, X)$ for the mth component of the map F updated at the ith time from the linear sum of the function $g_{lm}(X)$ and the Lm coefficients $c_{lm}(I)$;
- a third step of computing in a processor a prescribed evaluation function J based on Q teaching vectors ($t_{a0}$, $t_{a1}$, $t_{a2}$, ... $t_{a(m-1)}$) relative to the Q categories over M-dimensional weighted vector space $\Omega_M$, and computing the coefficient $c_{lm}(I)$ which makes the evaluation function J a minimum; and
- a fourth step of storing the coefficient $c_{lm}(I)$ obtained in the third step in a digital memory.

9. A map determination method for use in a data processing system according to claim 8, the third step comprising:

a step of computing the error between the map $f_m(I, X)$ for every learning data category and the teaching vector $t_{am}$ using $$D_{qm}(l, X) = f_m(l, X) - t_{qm};$$

and a step of successively updating the coefficient $c_{lm}(I)$ using $$c_{lm}(l+1) = c_{lm}(l) - \epsilon \cdot D_{qm}(l, X) \cdot g_{lm}(X)$$

taking the (I+1)th item of learning data as X, the: (I+1)th item for the coefficient $c_{lm}(I)$ as $c_{lm}(I+1)$ and $\epsilon$ as a prescribed updating constant.

10. A map determination method for use in a data processing system according to claim 8, the first step comprising:

- a step of obtaining each component coordinate correlation coefficient with respect to the learning data belonging to each of the categories Q using a prescribed operational equation;
- a step of deciding a monomial taken as a normalized function from a combination of the coordinate components for which the correlation coefficient becomes large;
- a step of making a combination from the monomial taken as the normalized function for choosing a high order normalized function;
- a step of repeating the process of choosing the high order normalized function a prescribed number of times; and
- a step of arranging the combinations obtained in the repeated processes in order of largeness of correlation coefficient and in order of the smallness of the monomial and then selecting a prescribed number of items.

11. A map determination method for use in a data processing system according to claim 10 wherein the operational equation for obtaining the correlation coefficient is expressed by the equation $$\rho_{q,kl} = \frac{\sum_{X_q \in S_q} (X_{qk} - \mu_k) \cdot (X_{ql} - \mu_l)}{\left(\sum_{X_q \in S_q} X_{qk} - \mu_k\right)^{1/2} \cdot \left(\sum_{X_q \in S_q} X_{ql} - \mu_l\right)^{1/2}}$$

$$\mu_k = \frac{\sum_{X_q \in S_q} X_{qk}}{|S_q|} \quad (0 \leq k \leq N-1)$$

where k is the average component value.

12. A map determination apparatus for building a map F from N-dimensional weighted vector space $\Omega_N$ to M-dimensional weighted vector space $\Omega_M$ comprising:

- first means for computing L complete component functions $g_{lm}(X)$ determined from the distribution of samples grouped into Q categories in the N-dimensional weighted vector space $\Omega_N$;
- second means for computing the function $f_m(X)$ for the mth component of the map F from the linear sum of the function $g_{lm}(X)$ and the Lm coefficients $c_{lm}$;
- third means for computing a prescribed evaluation function J based on Q teaching vectors ($t_{a0}$, $t_{a1}$, $t_{a2}$, ... $t_{a(m-1)}$) relative to the Q categories over M-dimensional weighted vector space $\Omega_M$, and means for computing the coefficient $c_{lm}$ which makes the evaluation function J a minimum; and
- fourth means for storing the coefficient $c_{lm}$ in memory.

13. A map determination apparatus according to claim 12, wherein the evaluation function J is expressed by:

$$J = \sum_{q=0}^{Q-1} E\{X \in S_q\} \cdot \left\{ \sum_{m=0}^{M-1} (f_m(X) - t_{qm})^2 \right\}$$

when $E\{X \in S_q\} \cdot \{f(X)\}$ is computed across all elements of the learning samples $S_q$ to obtain the desired value for the function $f(X)$.

14. A map determination apparatus according to claim 13, wherein the third means finds the partial differential for the evaluation function J using the coefficient $c_{lm}$, and finds the coefficient clm by making the partial differential zero in order to make the evaluation function J a minimum.

15. A map determination apparatus according to claim 14, wherein the function $g_{lm}(X)$ is a variable monomial.

16. A map determination apparatus according to claim 14, the third means comprising:

first arithmetic means for calculating $$\alpha_{mij} = \sum_{q=0}^{Q-1} E\{X \in S_q\} \cdot \{g_{im}(X) \cdot g_{jm}(X)\}$$

second arithmetic means for calculating $$\beta_{mi} = \sum_{q=0}^{Q-1} t_{qm} \cdot E\{X \in S_q\} \cdot \{g_{im}(X)\}$$

and third arithmetic means for calculating $$\sum_{j=n}^{Lm-1} \alpha_{mij} \cdot c_{jm} - \beta_{mi} = 0$$

to the coefficient $c_{jm}$.

17. A map determination apparatus according to claim 13, wherein the third means obtains the coefficient $c_{lm}$ suitable for use in the steepest descent method for the evaluation function J.

18. A map determination apparatus according to claim 13, further comprising means for giving the Sigmoid function with respect to the map output for the function $f_m(X)$ obtained as a result of having obtained the coefficient clm.

19. A map determination apparatus for building a map F from N-dimensional weighted vector space $\Omega_N$ to M-dimensional weighted vector space $\Omega_M$ comprising:

first means for computing L complete component functions $g_{lm}(X)$ determined from the distribution of samples grouped into Q categories in the N-dimensional weighted vector space $\Omega_N$;

second means for computing the function $f_m(I, X)$ for the mth component of the map F updated at the ith time from the linear sum of the function $g_{lm}(X)$ and the Lm coefficients $c_{lm}(I)$;

third means for computing a prescribed evaluation function J based on Q teaching vectors $(t_{a0}, t_{a1}, t_{a2}, \cdots t_{a(m-1)})$ relative to the Q categories over M-dimensional weighted vector space $\Omega_M$, and computing the coefficient $c_{lm}(I)$ which makes the evaluation function J a minimum; and fourth means for storing the coefficient $c_{lm}(I)$ in memory.

20. A map determination apparatus according to claim 19, the third means comprising:

computing means for computing the error between the map $f_m(I, X)$ for every teaming data category and the teaching vector $t_{am}$ using $$D_{qm}(l, X) = f_m(l, X) - t_{qm};$$

and updating means for successively updating the coefficient $c_{lm}(I)$ using $$c_{lm}(I+1) = c_{lm}(I) - \epsilon \cdot D_{qm}(l, X) \cdot g_{lm}(X)$$

taking the (I+1)th item of learning data as X, the (I+1)th item for the coefficient $c_{lm}(I)$ as $c_{lm}(I+1)$ and $\epsilon$ as a prescribed updating constant.

21. A map determination apparatus according to claim 19, the first means comprising:

means for obtaining each component coordinate correlation coefficient with respect to the learning data belonging to each of the categories Q using a prescribed operational equation;

means for deciding a monomial taken as a normalized function from a combination of the coordinate components for which the correlation coefficient becomes large;

means for making a combination from the monomial taken as the normalized function for choosing a high order normalized function;

means for repeating the process of choosing the high order normalized function a prescribed number of times; and means for arranging the combinations obtained in the repeated processes in order of largeness of correlation coefficient and in order of the smallness of the monomial and then selecting a prescribed number of items.

22. A map determination apparatus according to claim 21, wherein the operational equation for obtaining the correlation coefficient is expressed by the equation $$P_{q,kJ} = \frac{\sum_{X_q \in S_q}(X_{qk} - \mu_k) \cdot (X_{ql} - \mu_l)}{\left(\sum_{X_q \in S_q} X_{qk} - \mu_k\right)^{1/2} \cdot \left(\sum_{X_q \in S_q} X_{ql} - \mu_l\right)^{1/2}}$$

$$\mu_k = \frac{\sum_{X_q \in S_q} X_{qk}}{|S_q|} \quad (0 \leq k \leq N-1)$$

where k is the average component value.

23. A data processing apparatus comprising:

means for receiving N-dimensional input data to be processed; and means for converting the N-dimensional input data by using a map F, the map F being determined by a map determination apparatus, the map determination apparatus comprising:

first means for computing L complete component functions $g_{lm}(X)$ determined from the distribution of samples grouped into Q categories in a N-dimensional weighted input vector space $\Omega_N$;

second means for computing the function $f_m(X)$ for the mth component of the map F from the linear sum of the function $g_{lm}(X)$ and the Lm coefficients $c_{lm}$;

third means for computing a prescribed evaluation function J based on Q teaching vectors $(t_{a0}, t_{a1}, t_{a2}, \cdots t_{a(m-1)})$ relative to the Q categories over M-dimensional weighted vector space $\Omega_M$, and computing the coefficient $c_{lm}$ which makes the evaluation function J a minimum; and means for storing the coefficient $c_{lm}$ in a memory.

24. The data processing apparatus of claim 23 wherein the evaluation function J of the map determination method is expressed by:

$$J = \sum_{q=0}^{Q-1} E\{X \in S_q\} \cdot \left\{ \sum_{m=0}^{M-1} (f_m(X) - t_{qm})^2 \right\}$$

when $E\{X \in S_q\} \cdot \{f(X)\}$ is computed across all elements of the teaming samples $S_q$ to obtain the desired value for the function $f(X)$.

25. The data processing apparatus of claim 24, wherein in the third means computes the partial differential for the evaluation function J using the coefficient $c_{lm}$, and then finds the coefficient $c_{lm}$ by making the partial differential zero in order to make the evaluation function J a minimum.

26. The data processing apparatus of claim 25, wherein the function $g_{lm}(X)$ of the map determination method is a viable monomial.

27. The data processing apparatus of claim 25, wherein the third means comprises:

fourth means for computing $$\alpha_{mij} = \sum_{q=0}^{Q-1} E\{X \epsilon S_q\} \cdot \{g_{im}(X) \cdot g_{jm}(X)\}$$

fifth means for computing $$\beta_{mi} = \sum_{q=0}^{Q-1} t_{qm} \cdot E\{X \epsilon S_q\} \cdot \{g_{im}(X)\}$$

and sixth means for computing $$\sum_{j=n}^{Lm-1} \alpha_{mij} \cdot c_{jm} - \beta_{mi} = 0$$

to the coefficient $c_{jm}$.

28. The data processing apparatus of claim 24, wherein the coefficient $c_{lm}$ suitable for use in the steepest descent method for the evaluation function J is obtained.

29. The data processing apparatus of claim 24, means for computing a Sigmoid function with respect to the map output for the function $f_m(X)$ obtained as a result of having obtained the coefficient $c_{lm}$.

30. A data processing apparatus comprising:

means for receiving N-dimensional input dam to be processed; and means for converting the N-dimensional input dam by using a map F, the map F being determined by a map determination apparatus, the map determination apparatus comprising:

a first means for computing in a processor L complete component functions $g_{lm}(X)$ determined from the distribution of samples grouped into Q categories in a N-dimensional weighted input vector space $\Omega_N$;

a second means for computing in a processor the function $f_m(I, X)$ for the mth component of the map F updated at the ith time from the linear sum of the function $g_{lm}(X)$ and the Lm coefficients $c_{lm}(I)$;

a third means for computing in a processor a prescribed evaluation function J based on Q teaching vectors $(t_{a0}, t_{a1}, t_{a2}, \ldots t_{a(m-1)})$ relative to the Q categories over M-dimensional weighted vector space $\Omega_M$, and computing the coefficient $c_{lm}(I)$ which makes the evaluation function J a minimum; and means for storing the coefficient $c_{lm}(I)$ in a memory.

31. The data processing apparatus of claim 30, wherein the third means comprises:

a means for computing the error between the map $f_m(I, X)$ for every learning data category and the teaching vector $t_{am}$ using $$D_{qm}(I, X) = f_m(I, X) - t_{am};$$

and a means for successively updating the coefficient $c_{lm}(I)$ using $$c_{lm}(I+1) = c_l(I) - \epsilon \cdot D_{qm}(I, X) \cdot g_{lm}(X)$$

taking the (I+1)th item of learning data as X, the (I+1)th item for the coefficient $c_{lm}(I)$ as $c_{lm}(I+1)$ and $\epsilon$ as a prescribed updating constant.

32. The data processing apparatus of claim 30 wherein the first means comprises:

a means for obtaining each component coordinate correlation coefficient with respect to the learning data belonging to each of the categories Q using a prescribed operational equation;

a means for deciding a monomial taken as a normalized function from a combination of the coordinate components for which the correlation coefficient becomes large;

a means for making a combination from the monomial taken as the normalized function for choosing a high order normalized function;

a means for repeating the process of choosing the high order normalized function a prescribed number of times; and a means for arranging the combinations obtained in the repeated processes in order of largeness of correlation coefficient and in order of the smallness of the monomial and then selecting a prescribed number of items.

33. The data processing apparatus of claim 32 wherein the operational equation for obtaining the correlation coefficient of the map determination method is expressed by the equations $$\rho_{q,kl} = \frac{\sum_{X_q \epsilon S_q} (X_{qk} - \mu_k)(X_{ql} - \mu_l)}{\left(\sum_{X_q \epsilon S_q} X_{qk} - \mu_k\right)^{1/2} \cdot \left(\sum_{X_q \epsilon S_q} X_{ql} - \mu_l\right)^{1/2}}$$

$$\mu_k = \frac{\sum_{X_q \epsilon S_q} X_{qk}}{IS_q|} \quad (0 \leq k \leq N-1)$$

where k is the average component value.

* * * * *